June 14, 1955 W. W. KELLY 2,710,636
PITTING DEVICE FOR STEM BEARING FRUIT
Filed Feb. 27, 1951 13 Sheets-Sheet 1
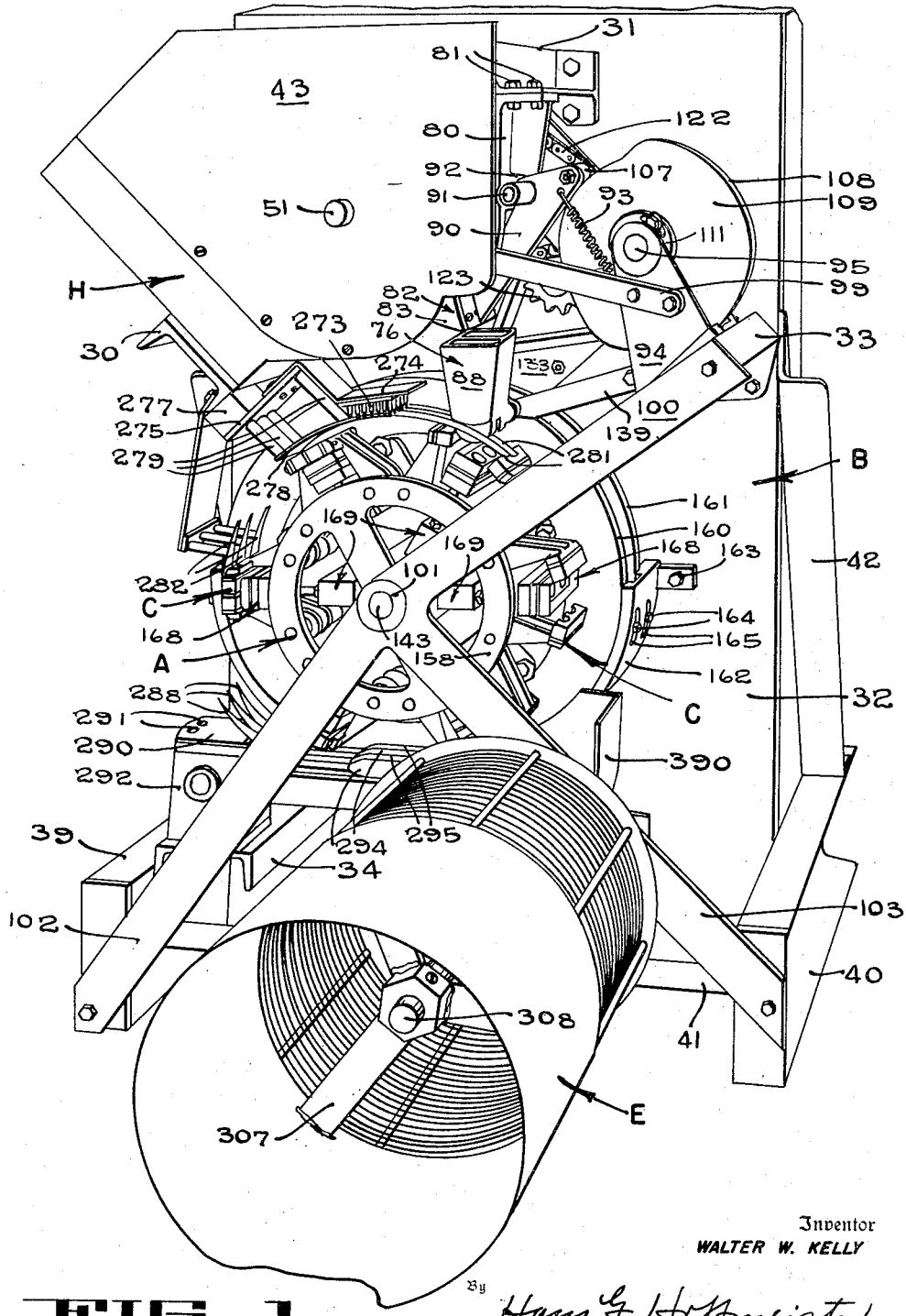
FIG_1
Inventor
WALTER W. KELLY
By Hans G. Hoffmeister
Attorney

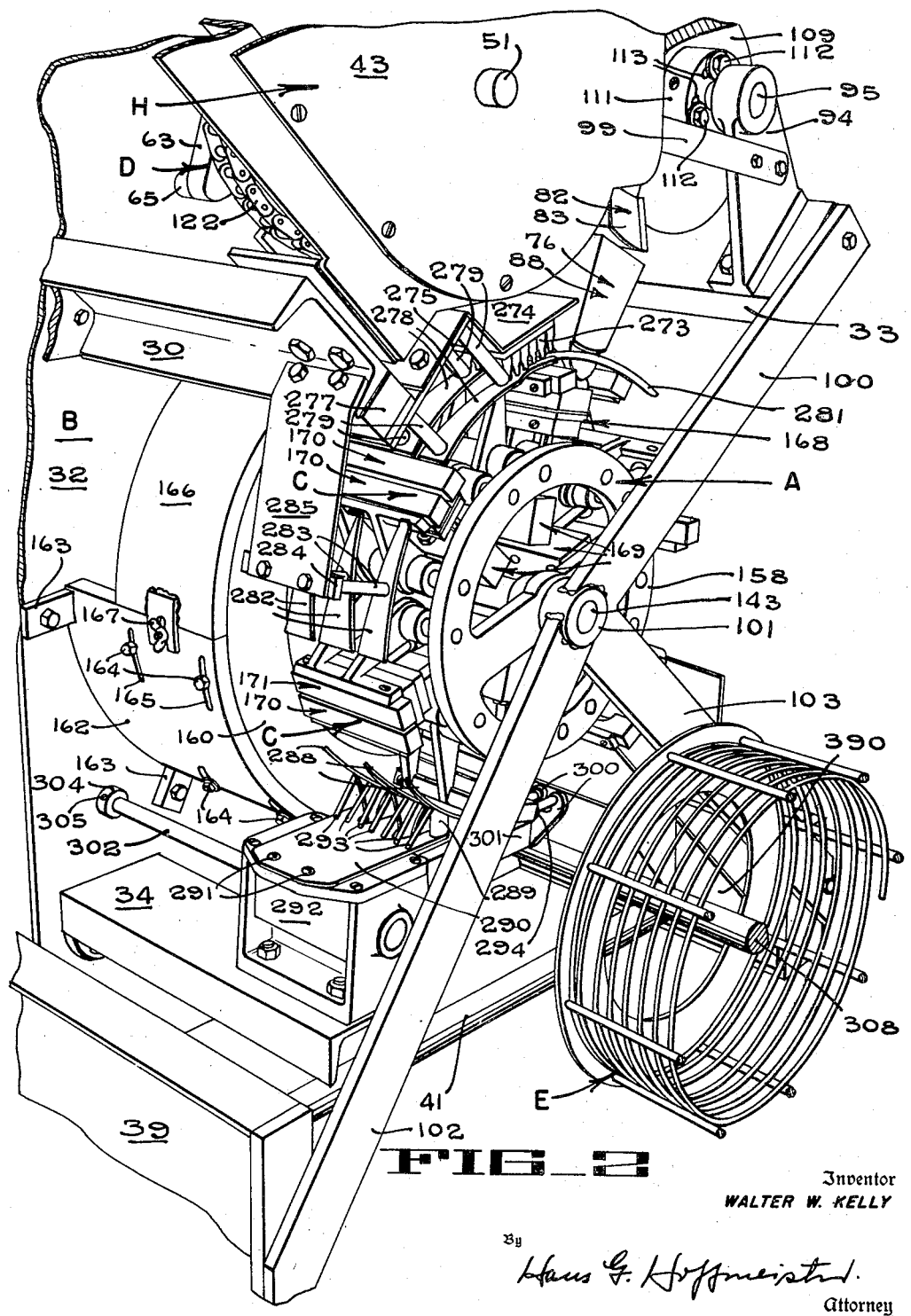

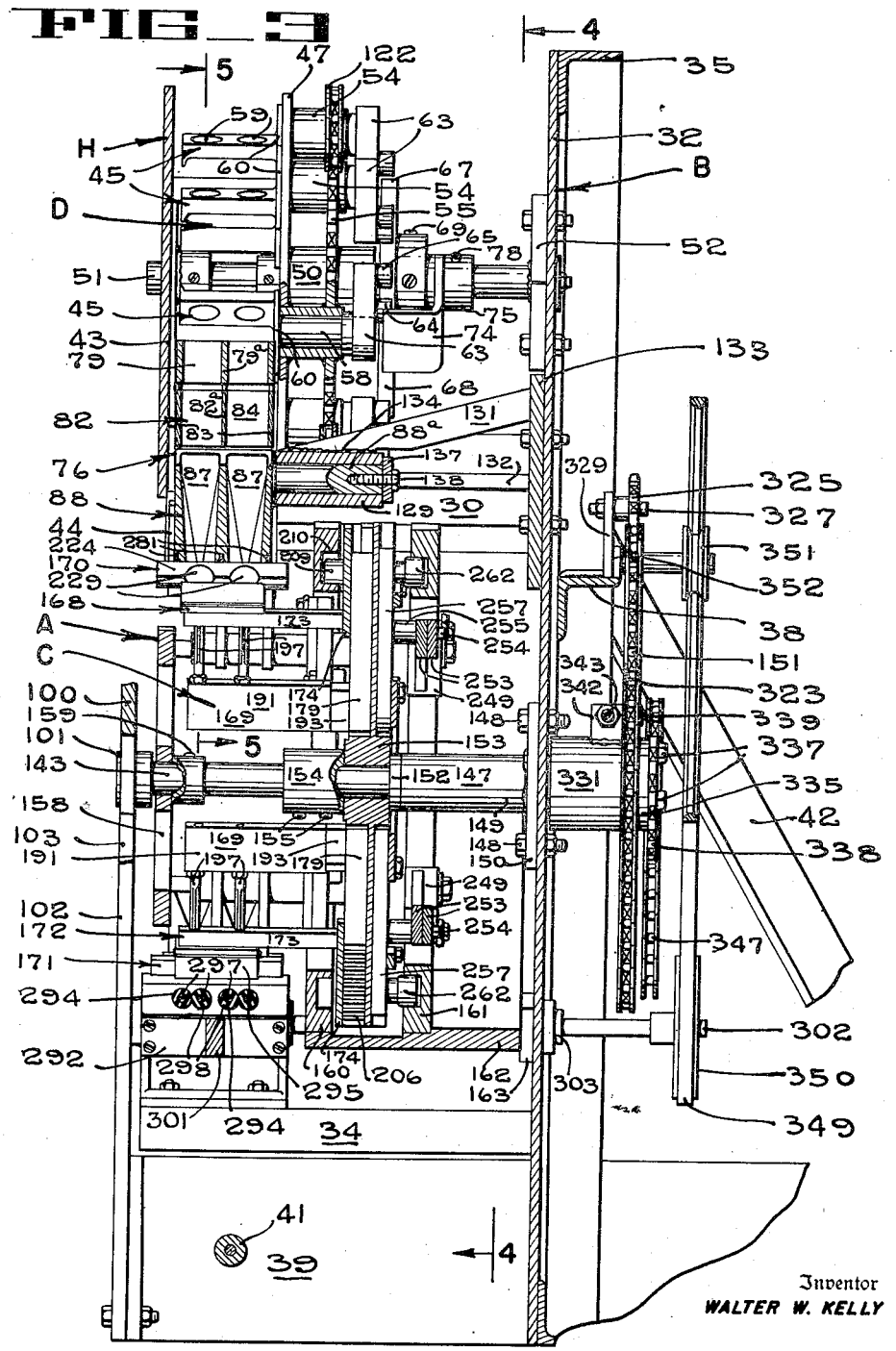

June 14, 1955
W. W. KELLY
2,710,636
PITTING DEVICE FOR STEM BEARING FRUIT
Filed Feb. 27, 1951
13 Sheets-Sheet 4
FIG_4
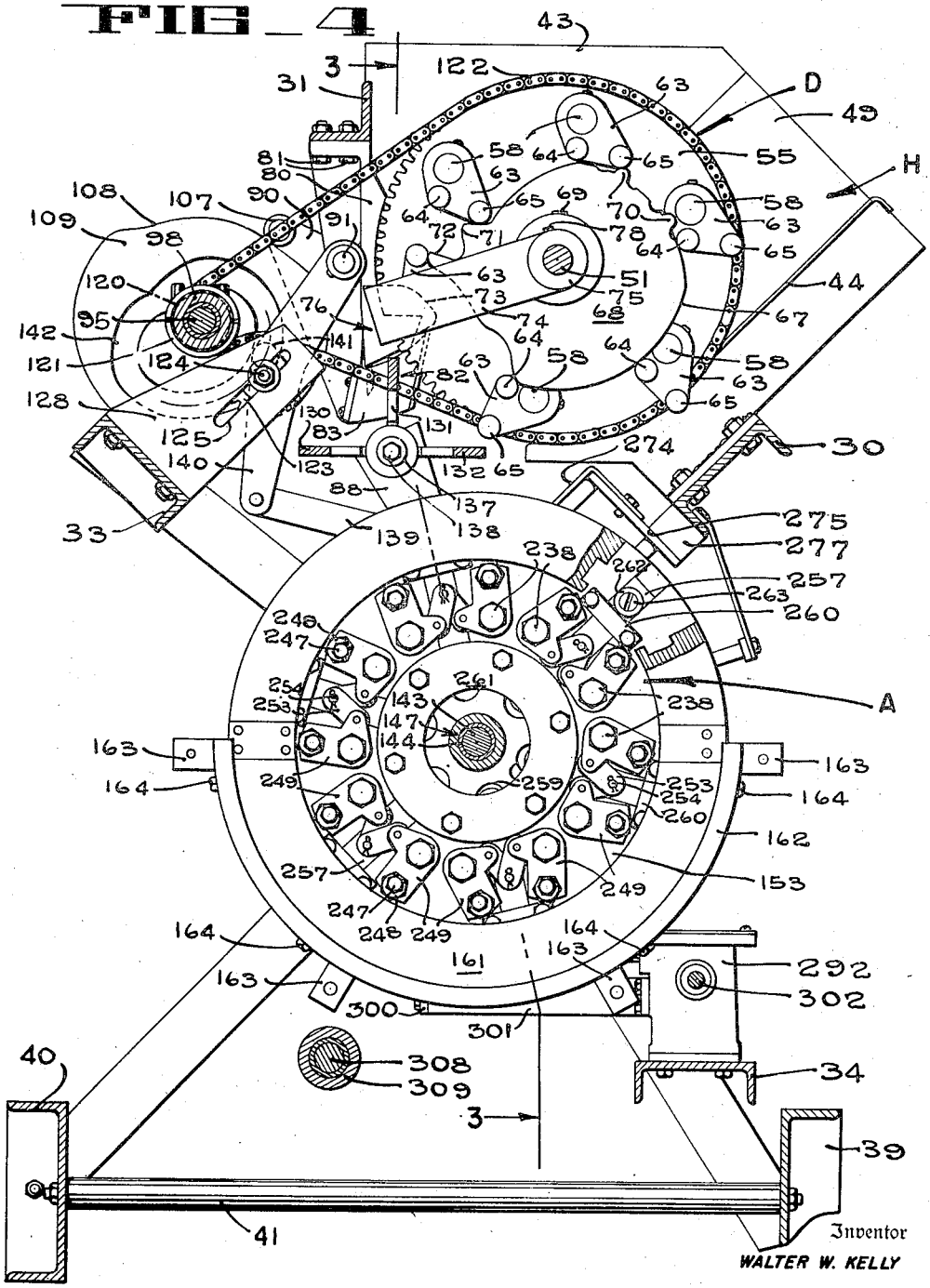
Inventor
WALTER W. KELLY
By Hans G. Hoffmeister.
Attorney

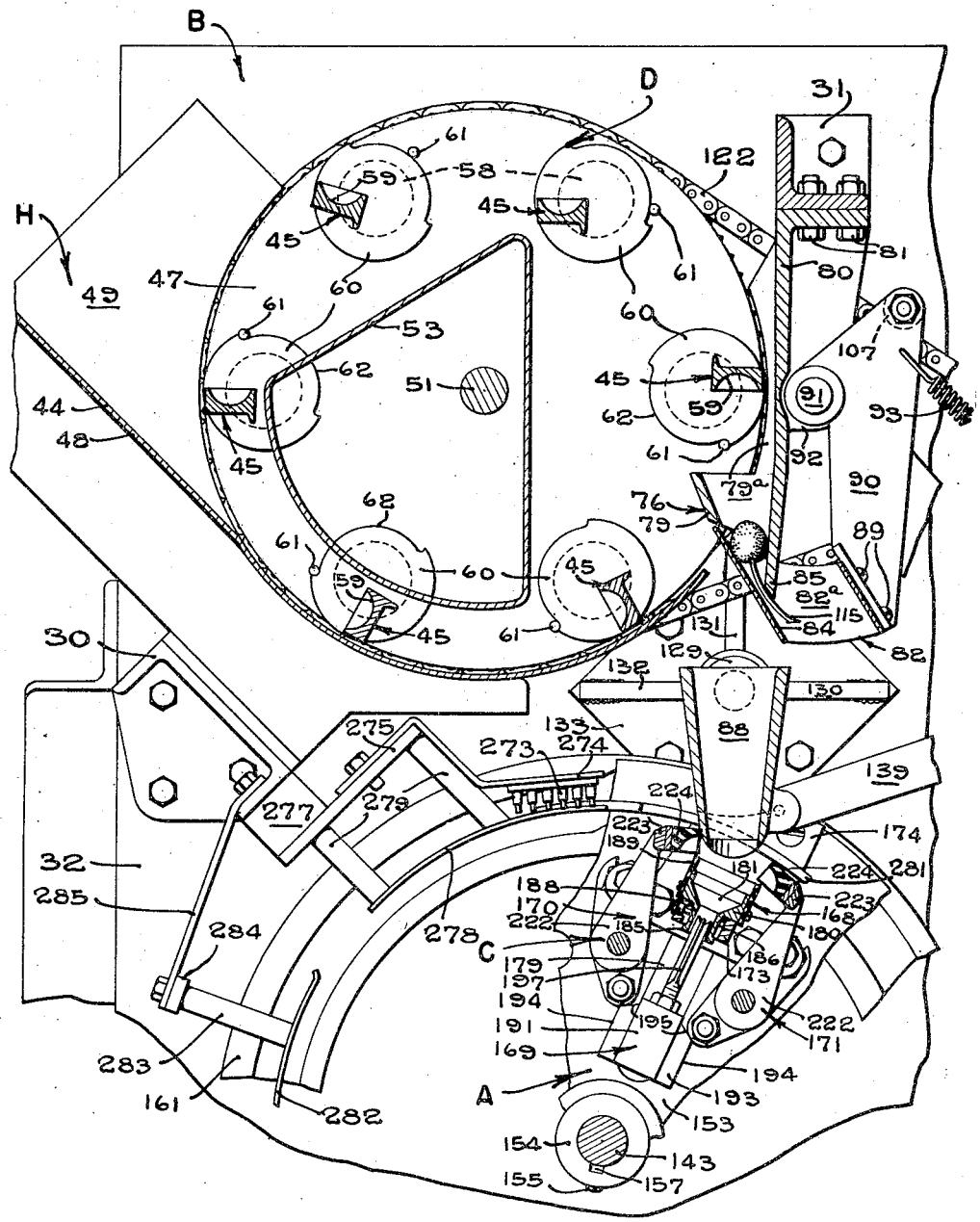
FIG_5

June 14, 1955 W. W. KELLY 2,710,636
PITTING DEVICE FOR STEM BEARING FRUIT
Filed Feb. 27, 1951 13 Sheets-Sheet 6
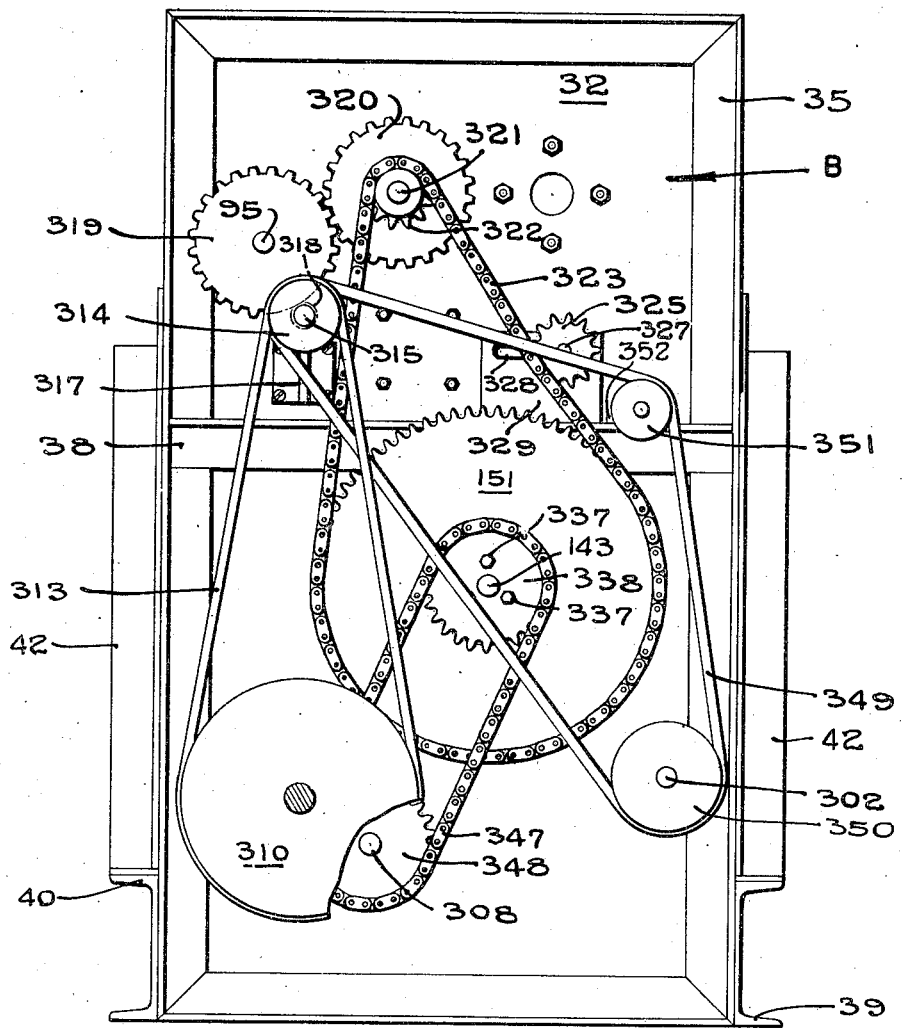
FIG_6
Inventor
WALTER W. KELLY
By Hans G. Hoffmeister
Attorney

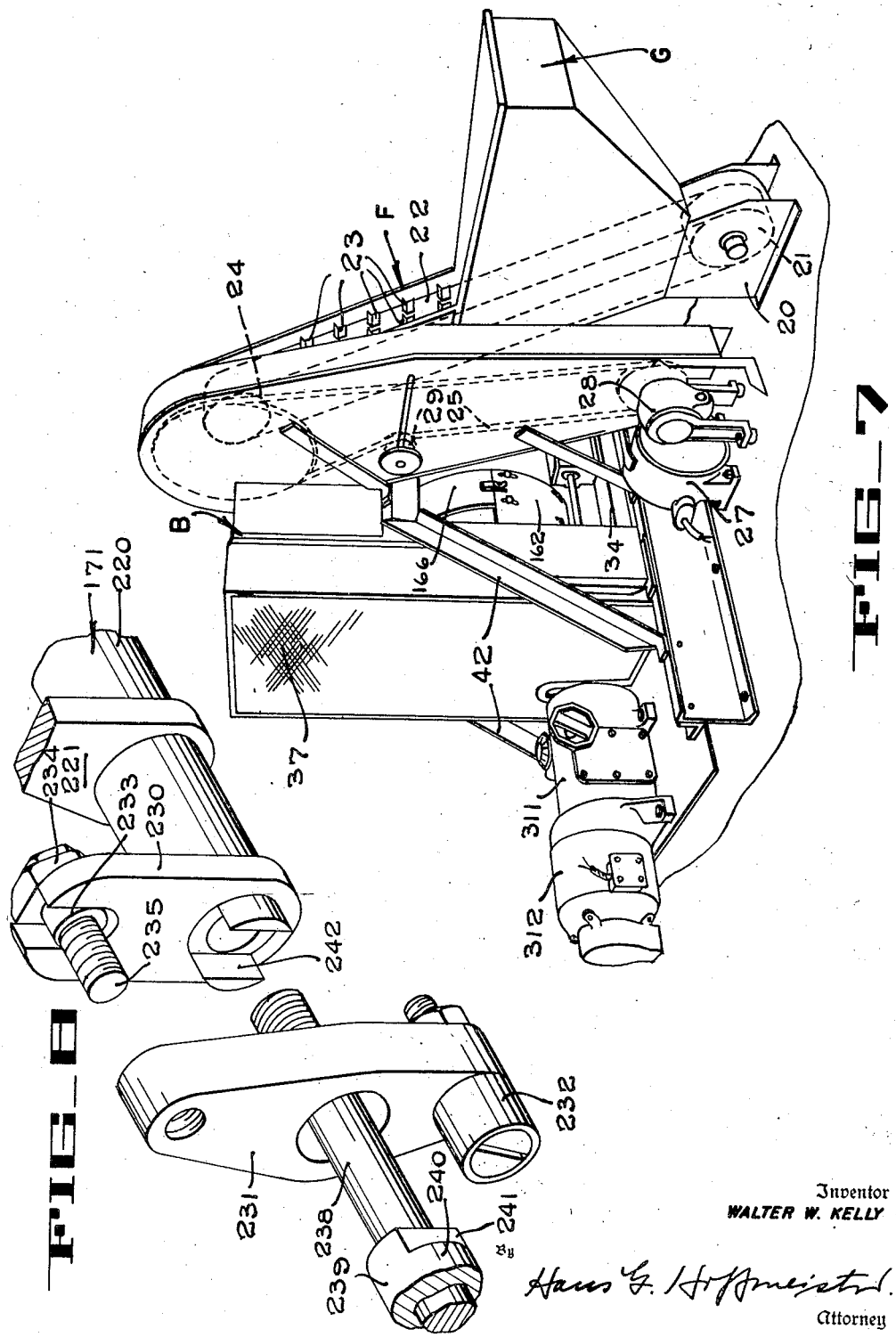

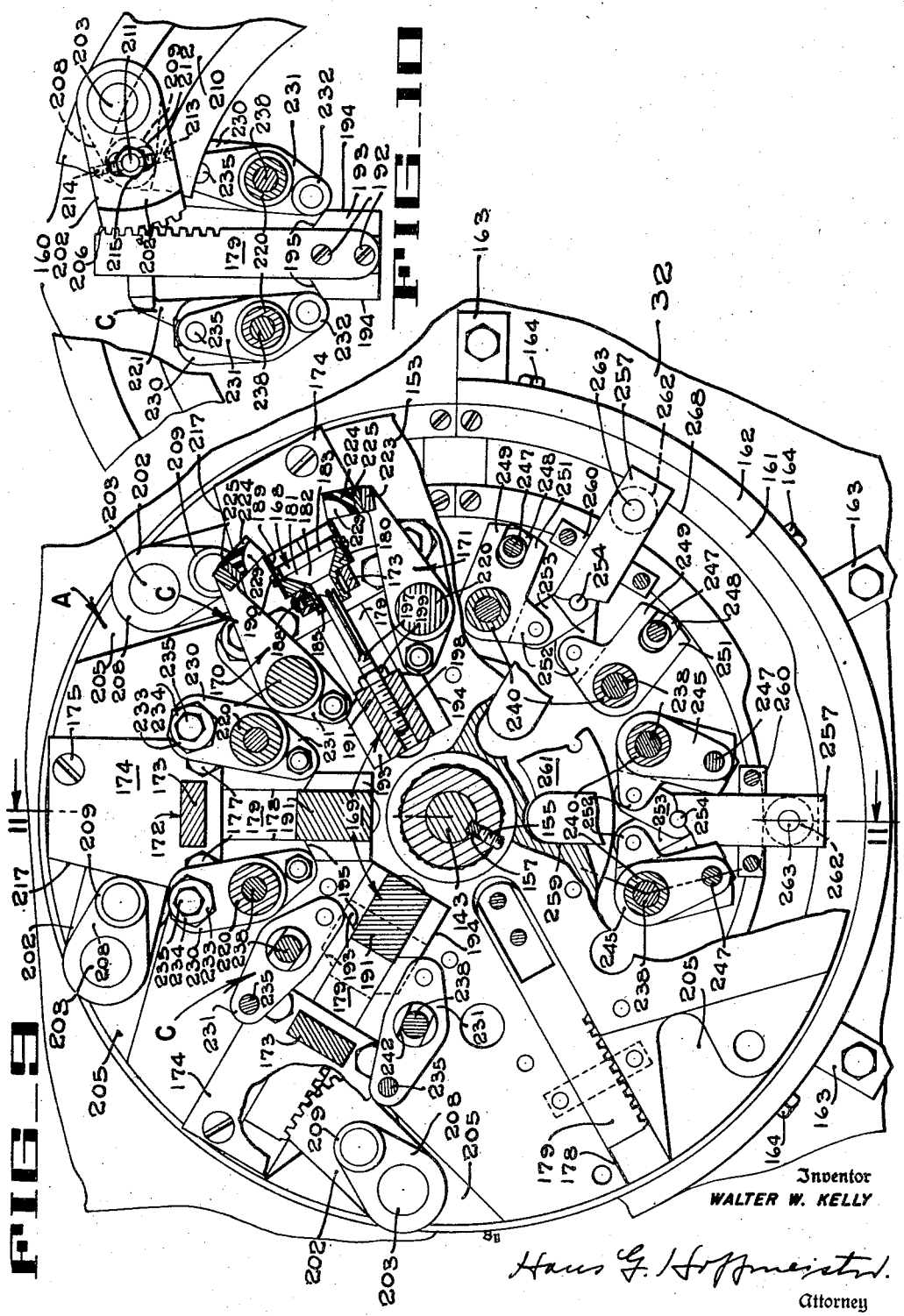

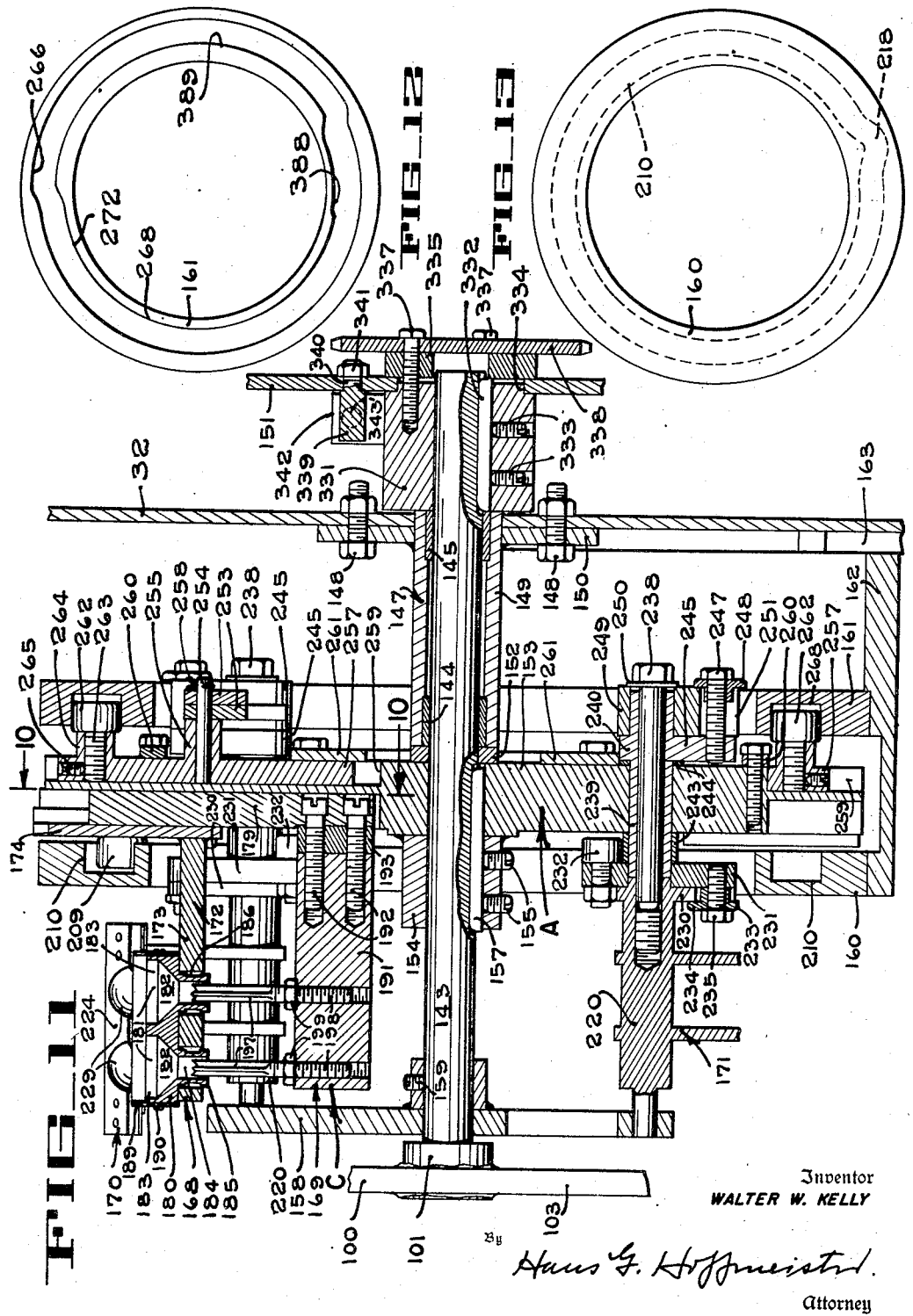

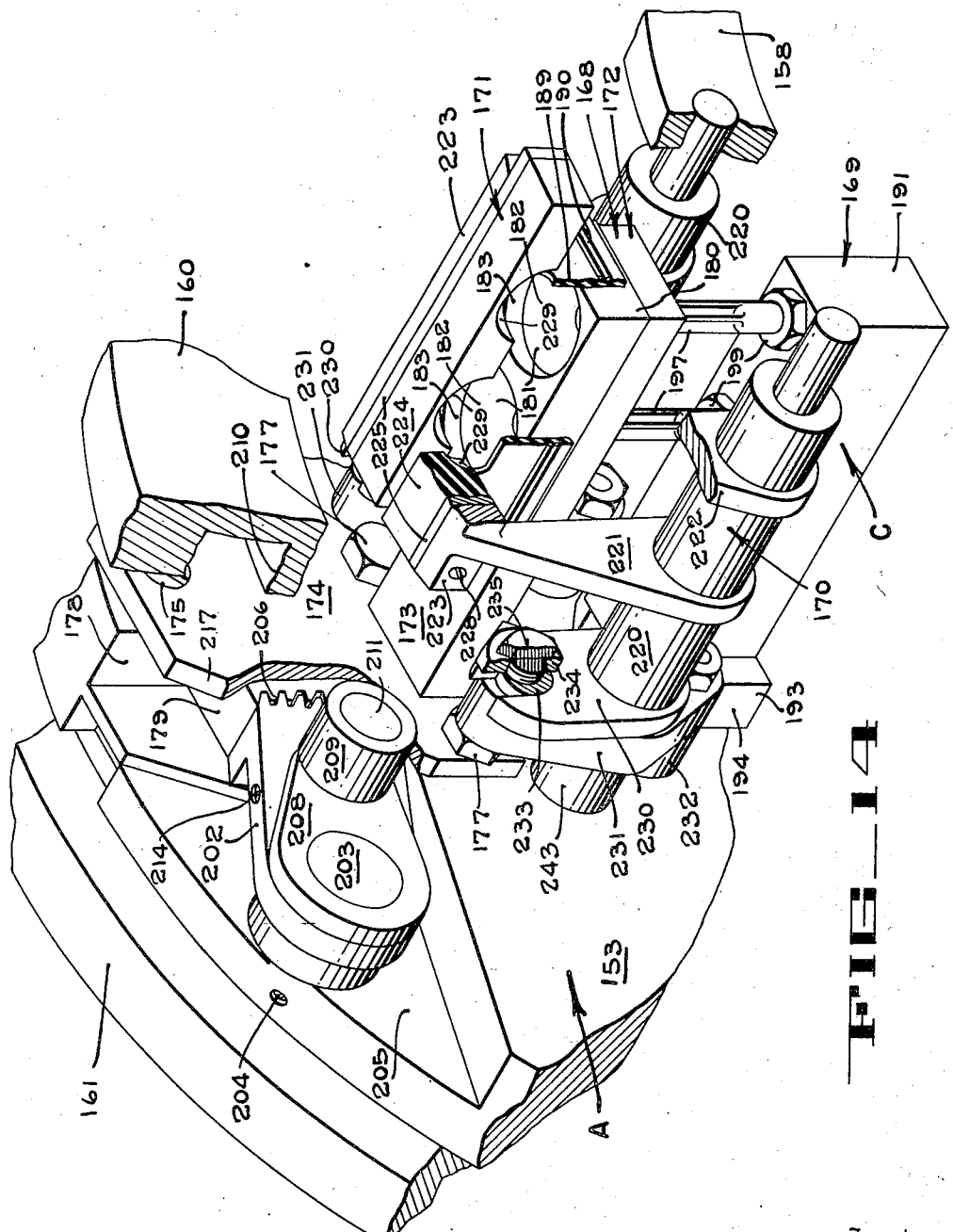

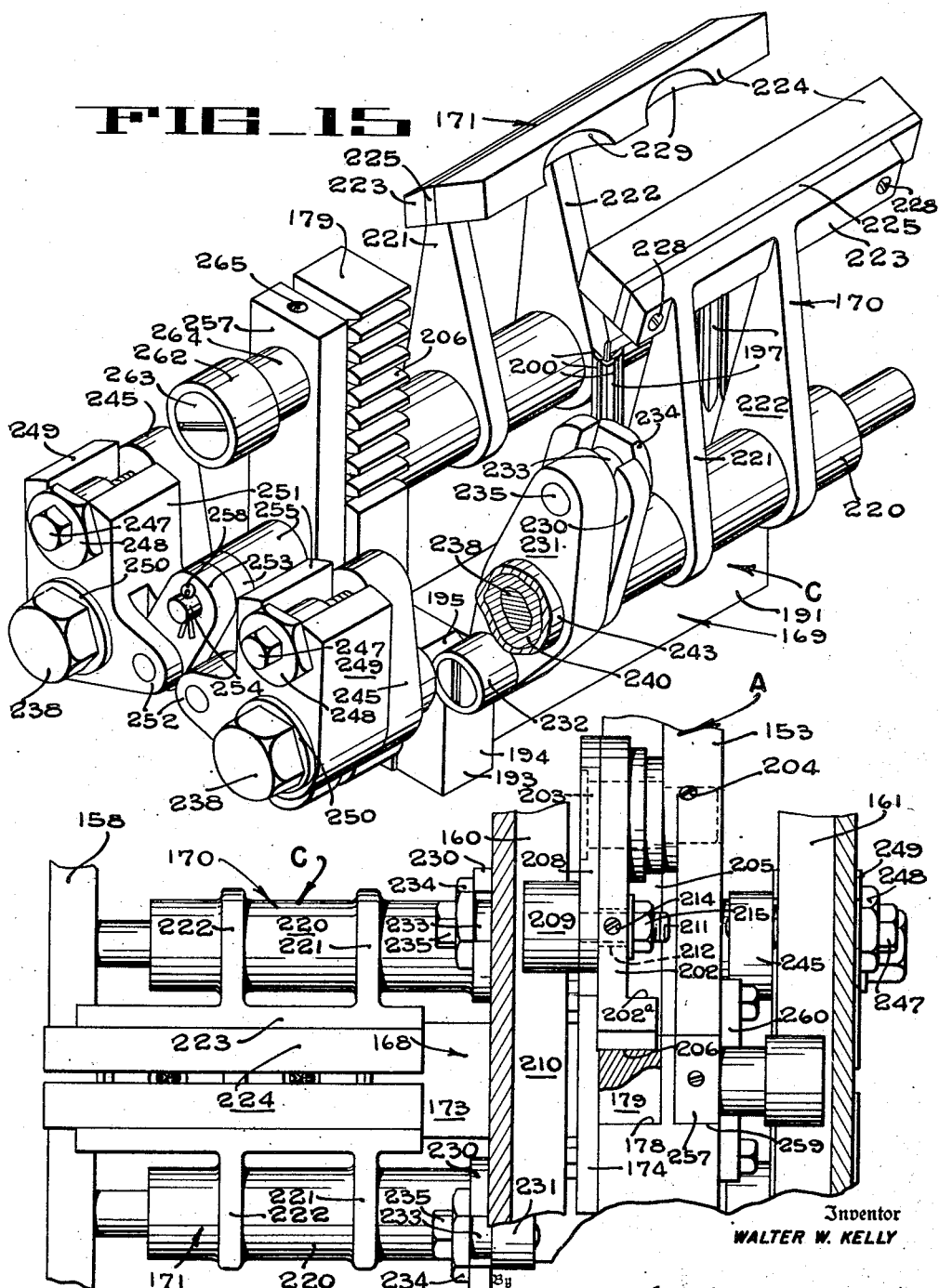

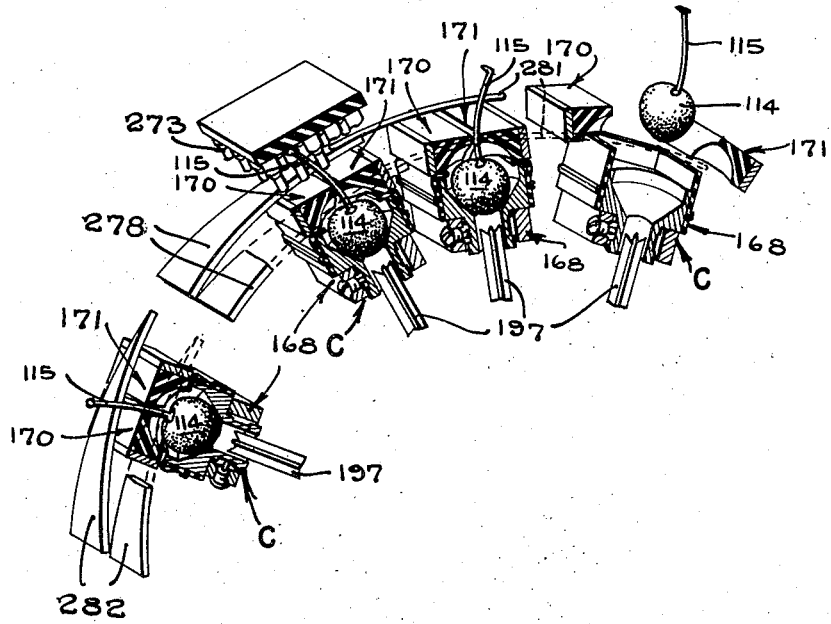
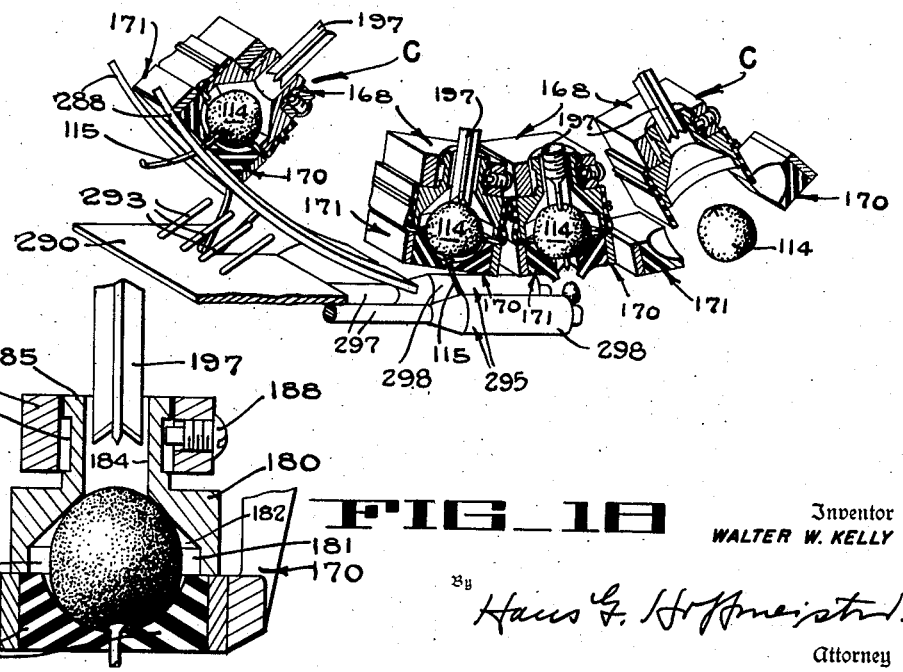

June 14, 1955  W. W. KELLY  2,710,636
PITTING DEVICE FOR STEM BEARING FRUIT
Filed Feb. 27, 1951  13 Sheets-Sheet 13
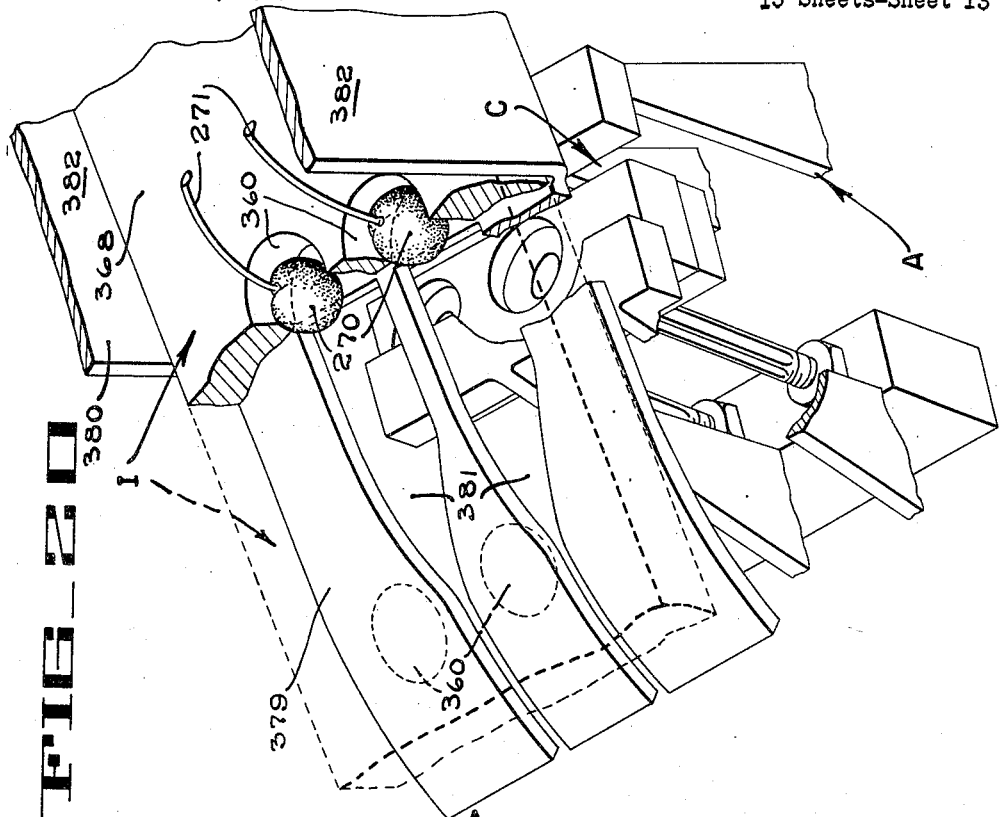
FIG_20
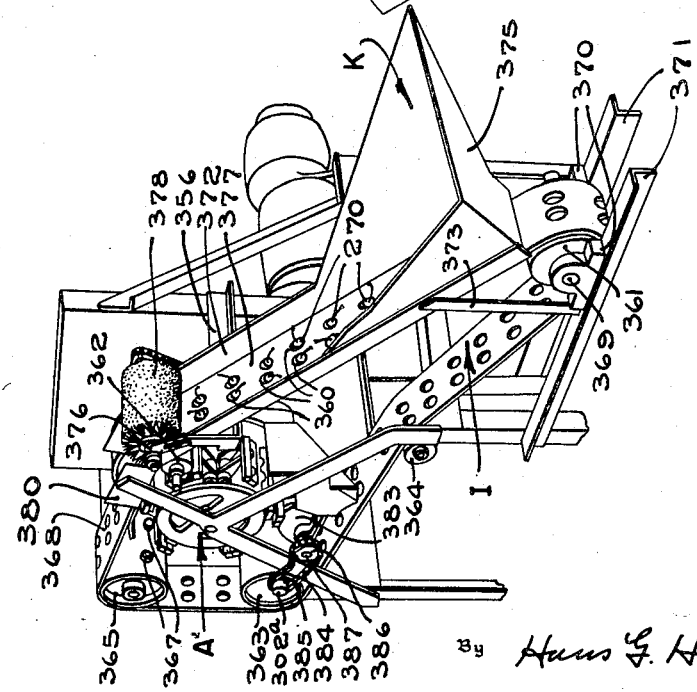
FIG_19
Inventor
WALTER W. KELLY
By Hans G. Hoffmeister
Attorney United States Patent Office 2,710,636
Patented June 14, 1955

2,710,636

PITTING DEVICE FOR STEM BEARING FRUIT

Walter W. Kelly, Portland, Oreg., assignor to Food Machinery and Chemical Corporation, San Jose, Calif., a corporation of Delaware Application February 27, 1951, Serial No. 212,947

18 Claims. (Cl. 146—18)

The present invention relates to fruit processing mechanism and pertains particularly to a machine for pitting and stemming fruit such as cherries.

In prior types of cherry pitters centrifugal force has been a principal factor in preventing high speed operation. While several types of rotary turret machines have been developed in the past, both for pitting and stemming cherries and similar fruit, attempts to operate these machines at speeds which would produce centrifugal force sufficient to urge the cherries outwardly away from their pitting or stemming cups or cavities in the rotor resulted in failure. This has been true of turret type machines wherein the turret is rotatable about either a horizontal or a vertical axis.

An object of the present invention is to feed a plurality of cherries into the pitting cups of a pitting unit carried by a turret rotating constantly at high speed from a feeding device moving congruently with the pitting unit, and then to enclose the cherries in the pitting cups before the cherries are moved sufficiently beyond the feeding zone to be thrown out of their cups by centrifugal force.

An object of the invention is to provide an improved fruit pitting and stemming machine.

Another object is to provide a machine capable of rapidly pitting and stemming large quantities of fruit.

Another object is to provide an improved cherry stemming and pitting machine wherein cherries with stems attached are rapidly and accurately positioned and operated upon by the machine.

Another object is to provide an improved high speed rotary type cherry preparation machine.

Another object is to provide a cherry preparation machine having a high speed pitting turret with means for retaining the cherries against discharge by centrifugal force until pitting and stemming operations on the cherries have been completed.

Another object is to provide improved stem positioning and removing means for a fruit processing mechanism.

Another object is to provide a fruit processing machine with improved feeding, positioning, gripping, pitting and stem removing mechanism.

These and other objects and advantages of the invention will be apparent from the following description and the accompanying drawings wherein:

Fig. 1 is a front perspetcive view of a machine embodying the present invention.

Fig. 2 is an enlarged fragmentary front perspective view of the machine showing the opposite side thereof from Fig. 1, portions being broken away.

Fig. 3 is a vertical section taken along line 3—3 of Fig. 4, portions thereof being broken away.

Fig. 4 is a vertical section taken along line 4—4 of Fig. 3.

Fig. 5 is an enlarged fragmentary section taken along line 5—5 of Fig. 3.

Fig. 6 is a rear elevation of the machine shown in Figs. 1 to 5, inclusive, the drive motor and speed reducer being removed and the main drive shaft being shown in section.

Fig. 7 is a rear perspective view of the machine as it appears assembled with an elevator for elevating fruit into the feed hopper.

Fig. 8 is an enlarged fragmentary exploded perspective showing parts of the fruit retaining and pitting jaw assembly.

Fig. 9 is a vertical transverse section through the pitting turret, each of the six pitting stations thereof being sectioned along different planes and portions thereof being broken away to show the operative features of the same.

Fig. 10 is a fragmentary section taken along line 10—10 of Fig. 11, a portion of the pitting cam being broken away.

Fig. 11 is a fragmentary section taken along line 11—11 of Fig. 9.

Fig. 12 is an elevation showing the grooved track side of the jaw actuating ring cam.

Fig. 13 is an elevation showing the closed side of the pitting prong actuating ring cam.

Fig. 14 is an enlarged fragmentary front perspective view of a pitting station, parts thereof being broken away.

Fig. 15 is a similarly enlarged fragmentary rear perspective view of the pitting station shown in Fig. 14, the pitting turret disc, the ring cams, and the pitting cup assembly being omitted, and an intermediate portion of one of the jaw assemblies being broken away.

Fig. 16 is a top plan view of the pitting station shown in Fig. 14, the upper portions of the front and rear ring cams being broken away to show the cam follower rollers riding in the grooved ring cam tracks, and an upper portion of the pitting prong actuating slide bar being broken away.

Fig. 17 is a diagrammatic perspective view showing one of the pitting stations at various stages of its operative cycle as it is carried around a generally circular path by the rotation of the pitting turret.

Fig. 18 is an enlarged fragmnetary section through a pitting cup in inverted position with the rubber retaining strip removed.

Fig. 19 is a perspective view showing a modified form of apertured belt feed mechanism associated with the pitting mechanism illustrated in Figs. 1 to 17, inclusive.

Fig. 20 is an enlarged fragmentary perspective view showing the portion of the belt feed mechanism illustrated in Fig. 19 in the zone where the cherries are dropped from the belt openings, through tapered gaps in a support plate into the pitting cups, portions being broken away.

The present invention is particularly adapted for use in processing cherries which have been de-clustered, but having their stems attached. However, it will be obvious to those familiar with the art that the invention also can be used for pitting de-stemmed cherries and for pitting and/or stemming other fruit, such as, for example, olives. As used herein and in the appended claims, therefore, the term "cherries" is intended to include such other fruit.

The machine of the present invention illustrated in Figs. 1 to 18, inclusive, comprises a pitting turret A (Figs. 1, 2, 9 and 11) mounted to rotate continuously at relatively high speed on a frame B, and having fruit pitting units C (Figs. 1, 2, 5, 9, 14 and 16) disposed symmetrically about the periphery thereof. Cherries are fed in successive predetermined batches into the pitting units C by a rotary feeding device D which is generally similar to that discolsed in Patent No. 2,428,370 to Walter W. Kelly issued October 7, 1947.

The fruit is de-stemmed and pitted as each pitting unit C is carried around a circular path by the rotating pitting turret A in a manner to be described later herein, the stems being discharged into a suitable chute or container, not shown, and the cherries and removed pits being discharged into a rotary screen E wherein the pits are separated from the processed cherries. An elevator F (Fig. 7) may be employed to elevate the fruit from a receiving hopper G into an auxiliary feed hopper H of the rotary feeding device D.

In Figs. 19 and 20 a modified form of feeding device is illustrated comprising an apertured feed belt I arranged to pass upwardly along a sloping trough which forms the bottom of a feed hopper K containing a mass of cherries, individual ones of which drop into the apertures in the belt and are supported therein by means underlying the belt until they arrive over the center of the pitting turret A. Here termination of the underlying support allows the cherries to drop through the belt into registering cups of a pitting unit C. This belt feed arrangement is generally similar to that disclosed in Patent No. 1,440,744 to Phillippe issued Jan. 2, 1923, but has certain distinguishing features which will be brought out later herein.

*Elevator and feed mechanism*

Referring first to the embodiment of the invention illustrated in Figs. 1 to 18, inclusive, the elevator F (Fig. 7) has its hopper G mounted on a base frame 20 having the tail roller 21 for an elevator belt 22 journaled therein. The elevator belt 22 slopes angularly upwardly along a side of the hopper G and has a plurality of transversely disposed flight strips 23 thereon. The upper end of the elevator belt 22 passes around a head roller 24 which is driven by a V-belt 25 from a motor 27 having a speed reducer 28 of a well known type connected thereto. An adjustable idler pulley 29 is provided to allow adjustment of the tension of the elevator drive belt 25.

The elevator F is mounted so that the cherries carried up by the flight strips 23 are discharged over the head roller 24 into the auxiliary feed hopper H which is mounted on a channel bracket 30 (Figs. 1, 2 and 4) and an angle bracket 31 (Fig. 4) secured to extend forwardly from a vertical frame plate 32. Other channel brackets 33 and 34 (Figs. 1, 2 and 4) also are secured to the vertical frame plate 32 to extend forwardly therefrom to support other portions of the stemming and pitting mechanism to be described later herein.

The upright frame plate 32 comprises a principal frame element of the stemming and pitting mechanism and is reinforced marginally by an angle metal frame 35 (Figs. 3 and 6). A transversely extending angle bracing member 38 also is secured to the frame plate 32 substantially mid-way of its height. The frame plate 32 thus reinforced is mounted between a pair of horizontal channel members 39 and 40, the forward ends of which are connected in laterally spaced relation by a tie bar 41 (Figs. 1, 2 and 4). Angle braces 42 secured to extend from the sides of the reinforced frame plate 32 to the horizontal channels 39 and 40 rigidly support the frame plate 32 in upright position. A wire mesh guard screen 37 (Fig. 7) is mounted over the driving mechanism on the rear side of the upright frame plate 32.

Continuing now with a brief description of the feeding device D, a forward wall 43 (Figs. 1, 2, 3, and 4) of the auxiliary feed hopper H is secured to the front ends of the support brackets 30 and 31, and a curved hopper bottom plate 44 is secured to the rear side of the forward hopper wall 43. The hopper bottom plate 44 is curved to conform to the generally circular path of a plurality of pocketed feed members 45 mounted on a feed reel disc 47 which forms a major portion of the rear wall of the feed hopper H. The hopper bottom plate 44 also has an angularly sloping side portion 48 (Fig. 5) adapted to receive the cherries discharged over the head roller 24 of the elevator F, and a gusset plate 49 extends from the sloping side portion 48 to the reel disc 47.

The feed reel disc 47 has a hub portion 50 (Fig. 3) thereof journaled on a stationary shaft portion 51 of a bracket 52 bolted to the upright frame plate 32. A box frame filler member 53 (Fig. 5) of sheet metal is secured to the rear face of the forward hopper wall 43 and extends rearwardly a sufficient distance to just clear the reel disc 47. The box filler 53 partially supports the weight of the cherries in the feed hopper H and thus avoids having the pocketed feed members 45 plough downwardly through a mass of cherries in the feed hopper in a manner which might bruise the fruit.

A plurality of short, tubular connector bearings 54 (Fig. 3) are inserted in holes disposed symmetrically around the marginal area of the reel disc 47 and are welded therein. These tubular members 54 extend rearwardly from the reel disc 47 and their rear ends are inserted and welded in correspondingly arranged holes in a feed reel sprocket 55 welded co-axially on the reel hub 50. Each pocketed feed member 45 is mounted eccentrically on a stub shaft portion 58 (Figs. 3 and 5) journaled in one of the tubular bearing members 54, the eccentrically mounted feed members 45 extending forwardly to a point just clear of the front hopper wall 43.

Each pocketed feed member 45 has a plurality of pocket recesses 59 therein adapted to pick up and transport across the feed hopper a required number of individual cherries from the mass thereof in the feed hopper H at each passage of a feed member 45 therethrough. The number of cherry transporting recesses 59 in each feed member 45 corresponds to the number of cherries it is required that each feed member deliver during each cycle of its operation. In the illustrated form of the invention, this number is two, but for a production type machine eight would be a suitable number. The changes necessary to provide a machine for handling such additional numbers will be apparent to one familiar with the design of fruit processing machinery.

A radially extending flange 60 (Fig. 5) is provided around the forward end of each stub shaft 58 adjacent the feed reel disc 47, and a pin 61, secured in a hole in the reel disc 47, rides in a cut-away marginal portion 62 of the flange 60 to limit rotative movement of the feed member 45. A weighted feed member tilting arm 63 (Figs. 3 and 4) is secured to the rear end of each stub shaft 58 rearwardly of the feed reel sprocket 55, and is provided with two cam follower rollers 64 and 65 journaled thereon. The rollers 64 and 65 are adapted to ride on a cam track 67 formed peripherally of a cam plate 68, the hub of which is secured to the stationary feed reel support shaft 51 by a set screw 69.

The cam track 67 acts on the rollers 64 and 65 rotatively to position the successive feed members 45 in proper upright position during the portion of their cycle wherein they pick up their cherries as they emerge from the space between the feed hopper bottom plate 44 (Fig. 5) and the box filler plate 53 and transport them across the upper portion of the feed hopper H. Several bumps 70 (Fig. 4) are provided on the cam track 67 to joggle the feed members 45 as they clear the mass of cherries in the feed hopper so as to shake off any cherries other than those seated in the recesses 59.

A pair of dumping projections 71 and 72 are provided on the cam track 67 to invert the pocketed feed members 45 (Fig. 5) causing them to dump the cherries carried thereby into a feed chute 76. An inturned end portion 73 (Figs. 3 and 4) of a strap cam member 74 has a hub portion 75 thereof secured by a set screw 78 to the stationary feed reel support shaft 51. The inturned end portion 73 of this strap cam 74 is positioned to engage the rollers 64 and 65 on the weighted arm 63 as they pass beyond the dumping cam projections 71 and 72 to turn the feed member 45 in a reverse direction from the inverting movement caused by the cam projections 71 and 72 to allow the feed members 45 to clear the upper end of the feed chute 76.

The feed mechanism described up to this point is generally similar to that disclosed in Keily Patent No. 2,428,370 referred to previously herein. The feed chute 76, however, is a composite structure, and has novel features which tend to insure accurate depositing of a cherry in the pitting cups of successive pitting units C carried by the continuously rotating turret A.

The feed chute 76 comprises a stationary upper chute portion 79 (Figs. 4 and 5) formed integrally with an upright hopper wall portion 80 secured by bolts 81 to extend downwardly from the angle frame bracket 31. The chute portion 79 has a partition 79a centrally thereof, which extends upwardly in the form of a rib along the inner face of the wall portion 80. A swinging intermediate chute portion 82, having a vertical central partition 82a therein (Fig. 3), has similar front and rear wall portions 83 the upper and lower edges of which are curved concentrically with the axis of swing of the chute portion 82. The curved upper edge of the intermediate chute portion 82 is adapted to swing closely adjacent a lower end portion of the stationary upper chute portion 79, while the curved lower edge of the intermediate chute portion 82 is adapted to swing closely adjacent the open upper end of a pivotally mounted lower chute portion 88. The lower chute portion 88 has a plurality of passages 87 extending lengthwise therethrough and adapted to receive individual cherries released by the intermediate chute portion for discharge into individual pitting cups in the pitting turret A in a manner generally similar to that of Kelly Patent No. 2,428,370 mentioned previously herein.

The swinging intermediate chute portion 82 is secured by screws 89 (Fig. 5) to the lower end of a cam actuated, spring biased lever arm 90, which is pivoted on the forwardly extending portion of a pivot pin 91 mounted in a boss 92 formed on the hopper wall portion 80. The arm 90 is adapted to swing the intermediate chute portion 82 mounted thereon from an open position (Fig. 4) wherein the intermediate chute portion 82 is in alignment with the fixed upper chute portion 79, to a closed position (Fig. 5) wherein the left hand wall 84 of the intermediate chute portion 82 is positioned closely adjacent a downwardly extending portion 85 of the hopper wall portion 80. A coil spring 93 (Figs. 1, 2 and 5) is connected in tension between an upper portion of the intermediate chute support arm 90 and a front cam shaft bearing bracket 94 and normally urges the arm 90 in a clockwise direction toward its open position as shown in Figs. 1, 2 and 4.

For actuating the intermediate and lower chute portions in timed sequence with each other, and with other mechanisms to be described later herein, a cam shaft 95 (Figs. 1, 2, 4 and 6) is journaled in the front cam shaft bearing bracket 94 and in a rear bearing bracket 98 (Fig. 4) secured to the upright frame plate 32. A bracing strap 99 (Figs. 1 and 2) is connected from the front cam shaft bearing bracket 94 to the feed hopper H, and a diagonal bracing bar 100 (Figs. 1, 2 and 4) extends from the forward end of the channel bracket 33 to a front pitting turret bearing 101 to which it is welded. A pair of diagonal bracing bars 102 and 103 have their upper ends welded to the front pitting turret bearing 101, their lower ends being secured, respectively, to the front ends of the base channels 39 and 40.

A cam follower roller 107 is journaled on a side of the upper end portion of the intermediate chute support arm 90 and rides on a peripheral cam track 108 of a chute actuating cam 109 mounted on the cam shaft 95, and is adapted, during a predetermined portion of its cycle, to swing the intermediate chute support arm 90 against the biasing force of the coil spring 93 in a counterclockwise direction to its closed position (Fig. 5). The chute actuating cam 109 is mounted for rotative adjustment on a hub member 111 (Figs. 1 and 2) secured to the cam shaft 95 by cap screws 112 inserted through arcuate slots 113 in the hub member 111 and screwed into threaded holes in the cam 109.

The feed mechanism D is driven from the chute actuating cam shaft 95 by means of a feed reel drive sprocket 120 (Fig. 4) having a split hub portion 121 which is clamped in rotatively adjusted position on the cam shaft 95. A chain 122 is passed around this sprocket and also around the large feed reel sprocket 55. A usual slack take-up idler sprocket 123 (Fig. 4) is journaled on a bolt 124 secured in adjusted position in a slot 125 in a bracket 128 mounted on the channel frame bracket 33.

The peripheral cam track 108 on the chute actuating cam 109 is formed and adjusted to elevate the roller 107 to swing the intermediate chute portion 82 to its retracted closed position shown in Fig. 5 as each pocketed feed member 45 dumps its charge of cherries into the stationary upper chute portion 79, and then to free the roller 107 to permit the coil spring 93 to swing the intermediate chute portion 82 to its open or cherry discharging position (Figs. 1, 2 and 4) at the stage in the rotative cycle of the pitting turret A where it is desired to discharge the individual cherries through the passages 87 in the pivotally mounted lowermost chute portion 88. The lowermost chute portion 88 has a rearwardly extending mounting stud 88a formed integrally therewith, the stud 88a being pivotally mounted in a tubular bearing member 129 (Figs. 3, 4 and 5) supported from the upright frame plate 32 in axially horizontal position by three legs 130, 131 and 132. The rear ends of the legs are welded to a plate 133 secured to the upright frame plate 32, while their forward ends are welded at 134 to the tubular bearing member 129. The mounting stud 88a is slightly longer than the bearing member 129 in which it is pivotally mounted, and is retained against forward axial displacement therein (Fig. 3) by a retaining washer 137 and a screw 138 screwed into a threaded axial hole in the end of the stud 88a.

The lower or discharge end of the lowermost chute portion 88 is connected (Figs. 1, 4 and 5) by an actuating link 139 to the lower end of a lower chute actuating lever arm 140, the upper end of which is pivotally mounted on the opposite end of the pivot pin 91 from the intermediate chute actuating lever arm 90. A cam follower roller 141 (Fig. 4) is journaled on a side of the lever arm 140 substantially midway of its length, and rides in a grooved cam track 142 provided therefor in a side of the chute actuating cam 109.

The grooved cam track 142 is formed to swing the lower or discharge end of the lowermost chute portion 88 congruently with the pitting cups of each successive pitting unit C for a predetermined distance as it is carried past beneath the chute by the uniform rotation of the pitting turret A, and then to swing the lower chute portion 88 in the opposite direction back to its starting position during the interval between successive pitting units. The peripheral cam track 108 is formed relatively to the grooved cam track 142 so as to allow the coil spring 93 to swing the intermediate chute portion 82 to its open position (Figs. 1, 2 and 4) as the discharge end of the lower chute portion 88 moves congruently with a pitting unit C, and to raise the roller 107 to swing the intermediate chute portion 82 to its closed position (Fig. 5) as the lower chute portion is swung back to its starting position.

*Pitting turret and cams*

The pitting turret A is mounted on a shaft 143 to rotate therewith. The shaft 143 is journaled in bushings 144 and 145 (Fig. 11) inserted in counterbored portions in opposite ends of a bearing bracket 147 secured by bolts 148 to the upright frame plate 32. The forward end of the shaft 143 is journaled in the frame mounted bearing 101 (Figs. 1, 2 and 3) mentioned previously herein.

The pitting turret shaft bearing bracket 147 (Fig. 11) comprises a tubular portion 149 welded in position in a hole in a mounting plate portion 150. The tubular portion 149 extends rearwardly beyond the mounting plate portion 150 a distance slightly greater than the thickness of the upright frame plate 32, and is inserted in a hole provided therefor in the upright frame plate. Thus this rearwardly extending portion serves as a locating flange for the bearing bracket 147 and also as a thrust bearing for the hub of a special pitting turret drive sprocket 151 mounted on the rear end of the pitting turret shaft. The sprocket 151 will be described later herein in connection with the driving mechanism. A collar 152 (Figs. 3 and 11) is mounted on the pitting turret shaft 143 between the forward end of the pitting turret bearing bracket 147 and a rear disc 153 of the pitting turret A. The hub 154 of the rear pitting turret disc 153 is secured to the pitting turret mounting shaft 143 by set screws 155 and a key 157. A front jaw support spider 158 of the pitting turret A is of smaller diameter than the rear disc 153, and its hub is secured to the turret support shaft 143 by a set screw 159.

The peripheral portion of the rear turret disc 153 is mounted (Figs. 3, 11 and 14) between two fixed cam rings 160 and 161 which are of slightly larger external diameter than the rear pitting turret disc 153. The cam rings 160 and 161 are mounted for relative rotative adjustment on a cylindrically curved cam ring support plate 162, which is secured, by ears 163 welded thereto, to the upright frame plate 32. The cam rings are secured to the curved cam ring support plate 162 by cap screws 164 which are inserted in slotted openings 165 in the support plate 162 and are screwed into threaded openings provided therefor in the cam rings. Loosening the cap screws 164 permits the cam rings 160 and 161 to be moved rotatively to adjusted positions after which the cap screws 164 may again be tightened to secure the cam rings in adjusted position. A removable top closure plate 166 (Fig. 2) is adapted to fit over the upper peripheral portions of the cam rings 160 and 161 and is attached to the ends of the curved support plate 162 by thumb screws 167.

Six similar cherry pitting units C are provided in symmetrically spaced relation between the jaw supporting spider 158 and the rear turret disc 153. Each pitting unit C comprises a pitting cup assembly 168 (Figs. 3, 5, 9, 11 and 14) affixed to the rear pitting turret disc 153, a radially movable pitting prong assembly 169 (also Fig. 15) mounted for radial reciprocating movement on the rear pitting turret disc 153, and a pair of cherry retaining and stem gripping jaw assemblies 170 and 171 pivotally mounted between the jaw support spider 158 and rear pitting turret disc 153.

Each pitting cup assembly 168 (Fig. 14) comprises a cup support bracket 172 having a cup supporting bar portion 173 welded to extend at right angles from a mounting plate portion 174. The mounting plate portion 174 of each pitting cup assembly is secured by a machine screw 175 and cap screws 177 to the front face of the rear turret disc 153 to bridge a radially directed slide bar mounting groove 178 in the rear turret disc 153 and thus to retain a pitting prong mounting slide bar 179, associated with each pitting cup assembly, for radial sliding movement in the groove. The bar portion 173 of each pitting cup support bracket 172 has a pitting cup block 180 (Figs. 9, 11, 14 and 18) mounted thereon. Each pitting cup block 180 has a plurality of pitting cup cavities 181 therein, the number thereof corresponding to the number of recesses 59 in the feed members 45, of the rotary feeding device D. Each pitting cup cavity 181 has a conically tapered bottom 182 and a cylindrical side wall 183. A hole 184 is provided through the cup block 180 centrally of each pitting cup cavity 181, the holes also extending through tubular extensions 185 provided on the inner side of the cup block 180. The tubular extensions 185 are inserted with a loose sliding fit in correspondingly located holes in the cup support bracket 172. Each tubular extension 185 has a peripheral groove 186 therein to receive the end of a set screw 188 which is inserted in a threaded hole in the cup support bracket to a sufficient depth to enter the groove 186, but to remain clear of contact with the bottom of the groove. Thus the set screws 188 retain the cup blocks 180 on their brackets 172 but permit limited axial sliding movement of the tubular extensions 185 in their respective mounting holes.

A retaining strip 189 of resilient material such as sheet rubber is adapted to be wrapped around each pitting cup block 180, and is retained thereon by a pair of wires 190 wound tightly around the rubber strip 189 to secure it to the block. The strip 189 extends radially outwardly slightly beyond the block 180 around which it is wrapped, to provide a resilient retaining flange for preventing the cherries from falling off the cup block 180 as they are dropped into the cup cavities 181 through the feed chute 76. The retaining strip 189 does not, however, extend beyond the block 180 a sufficient distance to interfere with cherries in the pitting cups when the jaws are closed as shown in Fig. 17, to effect folding of the outwardly projecting flange portion of the rubber retaining strip 189 inwardly over the pitting block.

This engagement of the retaining strip 189 by the jaws 170 and 171 prevents downward gravitational movement of the pitting cup block 180 when it is swung to inverted position beneath the pitting turret A. However, in pitting some types of cherries, the cherries may have a tendency to rebound in their respective cup cavities when their stems are extracted, and thus cause the cherries to turn in their pitting cups to improper positions for the subsequent pitting operation. In such cases the resilient retaining strips 189 may be omitted so that the pitting cup blocks 180 will be free to move relatively to the support bracket 172 within the limits of axial slidable movement of the tubular extensions 185 as determined by the width of the annular peripheral grooves 186 therein. Thus, when the pitting units C are in their uppermost upright position on the pitting turret A to receive a charge of cherries therein as shown in Fig. 14, the weight of the pitting blocks 180 will cause them to gravitate onto the bracket bar 173, while when the pitting units are in their lowermost, inverted, de-stemming, pitting and discharging positions, as shown in Fig. 18, the pitting cup blocks 180 will gravitate away from the bracket bar 173 to rest on the cherries in the pitting cups and thereby prevent them from turning when their stems are extracted.

A pitting prong mounting block 191 (Figs. 3, 5, 9, 11, 14 and 15) is secured by screws 192 to the lower end of each pitting prong slide bar 179, and a cam block 193 is interposed between the pitting prong support block 191 and the slide bar 179. Side portions 194 (Figs. 5, 9, 14 and 15) of the cam block 193 extend laterally beyond the pitting prong support block 191 and are beveled inwardly at their outer ends to provide sloping shoulders 195 which are forced, on an outward movement of the pitting prong assembly 169, to pass between a pair of jaw-closing rollers to be described later herein. A pair of pitting prongs 197 have threaded shank portions 198 (Fig. 11) which are screwed to adjusted positions in threaded holes provided therefor in each pitting prong support block 191 and are retained therein by lock nuts 199. The upper portion of each pitting prong 197 has a usual plurality of radially extending blade portions 200, the upper ends of which slant inwardly toward their common axis and are sharpened. The upper end of each pitting prong rides in the hole 184 of its associated pitting cup cavity 181.

A toothed rack 206 is provided in a side of each pitting prong slide bar 179 near its outer end, the rack teeth being in mesh with the teeth of a segmentally toothed pitting prong actuating member 202 pivotally mounted on a headed stud 203 (Figs. 9, 14 and 16) inserted in a hole in the rear pitting turret disc 153 and secured therein by a set screw 204. The segmentally toothed actuating member 202 is mounted for swinging movement in a recess 205 (Fig. 14) in the forward side of the rear pitting turret disc 153, and a cam actuated lever arm 208 (Figs. 9, 10, 14 and 16) is also pivotally mounted on the headed stud 203 forwardly of the segmentally toothed member 202.

A cam follower roller 209, adapted to ride in the grooved cam track 210 of the forward ring cam 160, is journaled on a stud 211, which (Figs. 10, 14 and 16) has the reduced, threaded, shank portion thereof inserted through a hole in the cam actuated lever arm 208 and also through an arcuate slot 212 in the segmentally toothed member 202 to extend rearwardly thereof. For angularly adjusting the cam actuated lever arm 208 relatively to the segmentally toothed member 202, a pair of set screws 213 and 214 are screwed into holes in the inner and outer edges, respectively, of the segmentally toothed member 202, these holes opening into opposite ends of the arcuate slot 212 and gripping the shank of the cam roller support stud 211 in adjusted position between them. The cam roller support stud 211 is secured in such adjusted position in the slot 212 by a nut 215 screwed onto the rearwardly extending threaded rear end of the stud 211 and drawn down tight to grip the cam actuated lever arm 208 and the segmentally toothed pitting prong actuating member 202 between the nut 215 and the shouldered offset between the roller supporting portion of the stud 211 and its reduced shank portion. The rear side of the segmentally toothed member 202 is relieved at 202a (Figs. 10, 14 and 16) to admit a wrench, not shown, for adjusting the nut 215. A corner portion 217 (Fig. 14) of the pitting cup bracket plate 174 is cut away to clear the cam roller 209 and its supporting arm 208 upon pivotal movement of the latter about the headed stud 203.

A major portion of the grooved pitting prong actuating cam track 210 (Fig. 13) in the rear face of the forward cam ring 160 is circular, and is spaced from the axis of the pitting turret shaft 143 by a radial distance sufficient to maintain the pitting prongs 197 in their retracted position as shown in Fig. 14 during the entire rotative cycle of the pitting turret A except during the pitting stroke. A rise 218 is provided in the pitting cam track 210, at the stage of its rotative cycle where the fruit is to be pitted to move the cam follower roller 209 outwardly and thereby swing the cam actuated lever arm 208 and the segmentally toothed member 202 outwardly. The meshed interengagement of the segmentally toothed member 202 with the rack 206 on the slide bar 179 thereby moves the slide bar and the pitting prong assembly 169 carried thereby radially outwardly.

The similar but opposite jaws 170 and 171 of each pair thereof are pivotally mounted with their axes of pivotal movement on opposite sides of the radial pitting prong slide bar groove 178 in the front face of the rear pitting turret disc 153, the forward ends of the jaws being pivotally mounted in holes in the jaw support spider 158 (Figs. 1, 2, 3, 11, 14 and 16). Each of the jaws 170 and 171 comprises a body portion 220 (Figs. 3, 8, 9, 10, 11, 14, 15 and 16) with a pair of laterally extending arms 221 and 222 formed integrally therewith and connected together at their free ends by a bar portion 223. A facing block 224 of resilient deformable material, such as rubber, having a hard base portion 225 integrally secured thereto, is mounted on the inner face of each jaw bar 223 by screws 228. A pair of quarter-spherical recesses 229 are provided in the inner face of each resilient facing block 224, to overlie the pitting cup cavities 181 in the pitting cup block 180 when the jaws are closed to complement the pitting cup cavities and loosely to enclose the cherries therein. The resiliency of the facing blocks is such as to permit a pit to be forced outwardly therebetween upon an actuation of the pitting prongs when the jaws are in their closed contacting relation.

A bifurcated arm 230 (Figs. 8, 9, 10, 11, 14, 15 and 16) is formed to extend laterally from adjacent the rear end of each jaw body portion 220, and a cam actuated jaw closing lever arm 231 is mounted for relative pivotal adjustment adjacent each bifurcated arm 230 for imparting a final squeeze to the jaws 170 and 171 upon actuation of the pitting prong assembly 169 associated therewith. This squeezing action is accomplished by a cam actuated roller 232 which is mounted on the radially inward end of each jaw squeezing lever arm 231 and is adapted, upon each actuation of the pitting prong assembly 169 associated therewith, to be engaged by a sloping shoulder 195 of the cam block 193 interposed between the pitting prong slide bar 179 and the pitting prong mounting block 191.

The end of each lever arm 231 opposite that having the roller 232 thereon is adjustably secured to the bifurcated end of the arm 230 on the jaw body portion 220 by an eccentric adjusting member 233 having a nut portion 234 formed integrally therewith. A cap screw 235 is inserted through an eccentric hole in the jaw adjusting member 233 and is adapted to be drawn down to clamp the bifurcated arm 230 between the nut portion 234 of the eccentric adjusting member 233 and the jaw squeezing lever arm 231. By loosening this cap screw 235, turning the eccentric adjusting member 233 to a desired position, and again tightening the cap screw, the roller supporting jaw squeezing lever arm 231 can be adjusted angularly relatively to the jaw body member 220 and thus adjust the amount of squeeze to be imparted to the jaws by the cam shoulders 195 upon actuation of the pitting prongs.

The rear end of the jaw body portion 220 (Figs. 8 and 11) has a hole drilled axially therein and counterbored, the inner portion of the hole being threaded to receive a jaw assembly bolt 238, which also is inserted through the tubular body portion 239 of a jaw actuating member 240. The forward end of the tubular portion 239 of the jaw actuating member 240 (Fig. 8) has flattened side faces 241 thereon which fit into the correspondingly notched-out rear end 242 of the jaw body member 220. A spacing sleeve 243 and spacing washer 244 (Fig. 11) are mounted on the tubular portion 239 of the jaw actuating member 240 on opposite sides of the rear pitting turret disc 153 to retain the entire jaw assembly against axial displacement.

For operating the jaw actuating member 240, an arm 245 (Figs. 9, 11, 15 and 16) is formed to extend at right angles from the tubular portion of the jaw actuating member 240 adjacent the rear end thereof. A jaw actuating bell crank lever 249 is mounted for pivotal adjustment on the tubular rear portion of the jaw actuating member 240 rearwardly of the arm 245 thereon, and is retained against rearward axial displacement by the head of the jaw assembly bolt 238 (Fig. 11) and a washer 250. One arm 251 of the bell crank lever 249 is bifurcated, and is adjustably connected to the arm 245 on the jaw actuating member 240 by an eccentric adjusting member 248 similar to the eccentric adjusting member 233 for adjusting the jaw squeezing lever arm 231, and a cap screw 247, which is inserted through the eccentric hole in the adjusting member 248 and is screwed into a threaded hole near the free end of the arm 245.

The other arm 252 of each bell crank lever 249 is connected by a link 253 to a pin 254 (Figs. 9, 11 and 15), inserted in hole in a rearwardly extending boss 255 on a jaw actuating slide bar 257 and silver soldered therein. The links 253 are retained on the pin 254 by a cotter key 258. Each jaw actuating slide bar 257 is mounted for slidable reciprocating movement in a radially extending groove 259 provided therefor in the rear side of the rear pitting turret disc 153 opposite the pitting prong actuating slide bar groove 178 therein (Figs. 3, 9, 11 and 16). The jaw actuating slide bars 257 are retained in their respective grooves by metal bridging strips 260 (Figs. 3, 4, 9, 11 and 16) and a bridging ring 261 secured by cap screws to the rear face of the rear pitting turret disc 153.

A cam follower roller 262 is rotatably mounted on a stud 263 screwed into a hole in a boss 264 (Figs. 9, 11 and 15) projecting from the rear side of the jaw actuating slide bar 257 near its outer end, and is secured therein by a set screw 265. This cam follower roller 262 rides in a forwardly facing grooved cam track 268 in the jaw actuating rear cam ring 161. The cam follower roller 262 actuates the slide bar 257 and the links 253 to control the principal jaw opening and closing movements, while the cam follower rollers 232 on the lower ends of the lever arm 231, when separated by the entrance of the sloping shoulders 195 of the cam block 193 therebetween, cause a final squeezing together of the jaws 170 and 171 during actuation of the pitting prongs.

Stem aligning means

As each batch of cherries is dumped (Fig. 5) by the inversion of the recessed feed members 45 into the respective passages formed in the respective parts 79, 82 and 88 of the feed chute, the stems of the cherries first tend to strike the upper edges of the upper chute portion 79 or the partition 79a to right the cherry with its stem end up. If, however, the cherry falls into the upper chute portion 79a in stem-end-down position as shown in Fig. 5, the side plate 84 of the intermediate chute portion 82 remains spaced from the lower end of the hopper wall portion 80 in the closed position of the intermediate chute portion a sufficient distance to let the stem project through the gap thus provided. Such projecting stems, upon release of the cherry by the swinging of the intermediate chute portion to its open position, will strike the upper edge of the lower chute portion 88 and thus will be righted before entering the passages 87 in the lower chute member 88. Since any cherries that are righted in the upper chute portion 79 will continue to drop stem-end-up, and since those which are in stem-end-down position tend to be righted, the cherries dropped through the lower chute passages 87 by the swinging of the intermediate chute portion 82 to open or cherry releasing position as shown in Figs. 1, 2 and 3 tend to land stem-end-up in the cup cavities 181 with their stems projecting radially of the turret A outwardly beyond the resilient jaw facing blocks 224.

In order to center the outwardly projecting stems and at the same time to bring the cherries to which they are attached into proper alignment for performance of the stemming and pitting operations to be described later herein, the jaws 170 and 171 are first swung from fully open to almost closed condition as they are carried by the rotation of the turret A beyond the lower end of the pivotally mounted lower chute portion 88. This partial jaw closing action is accomplished by the jaw actuating cam follower roller 262 moving from the higher portion 266 (Fig. 12) of the grooved cam track 268 in the rear cam ring 161 into the lower portion 272 thereof. This partial closing of the jaws swings the stems 115 of the cherries in the pitting cups radially outwardly so that the portions of the stems between the rubber jaw facing blocks 224 are disposed substantially on a radial plane of the pitting turret A.

From this point in their travel, and until the projecting stems of the cherries are about to enter between the stemming rolls, to be described later herein, the jaws 170 and 171 remain separated sufficiently to permit the projecting stems 115 to be swung lengthwise of the space between the jaws toward a radially centered position therein. The cherries 114 are held loosely within the enclosures formed by the pitting cup cavities 181 and the complementary recesses 229 in the rubber jaw facing blocks 224 during this portion of their travel to permit the cherries to be turned by means engaging their projecting stems to align the stem-blossom axes of the cherries radially of the pitting cups.

The means for aligning the projecting stems, and thereby the cherries to which they are attached, comprises a plurality of resilient rubber fingers 273 (Figs. 1, 2, 5 and 17) which are mounted, brush-like, on a sheet metal plate 274 secured to a plate 275 bolted to the underside of a spacing block 277, which in turn is secured to the underside of the channel frame bracket 30. The rubber fingers 273 are mounted adjacent the exterior side of a plurality of tapered, cylindrically curved comb members 278 mounted on the lower ends of a plurality of posts 279 which depend from the plate 275 secured to the underside of the spacing block 277.

The tapered comb members 278 are curved substantially co-axially of the pitting turret A and are mounted to lie slightly beyond the rotative sweep of the jaws 170 and 171 upon rotation of the pitting turret. Wire extension members 281, curved to conform to the curvature of the comb members 278, extend from the narrow end of each of the comb members 278 to a point beyond the zone wherein the cherries are discharged into the pitting cups from the lowermost chute portion 88. In the event the stems of any two cherries should become entangled after they have dropped into the pitting cup cavities 181 on opposite sides of a wire 281, they would be separated from each other by the subsequent action of the tapered comb members 278 as the cherries are carried around their curved paths in the cups of the pitting turret A. The side edges of adjacent tapered comb members 278 converge in the direction of pitting reel rotation, and the rubber brush fingers 273 cooperate with the comb members to swing the stems of the cherries toward a radially centered position over their respective cherries, and at the same time turn the cherries to align their stem-blossom axes radially of the turret A.

A second set of tapered comb members 282 further assists in swinging the stems of the cherries in the pitting cups toward properly centered position. The comb members 282 of this second set are generally similar to those of the first set 278 and are mounted on the lower ends of a plurality of posts 283 secured to a bar 284 which in turn is secured to the free end of a plate 285 bolted to the lower flange of the frame channel member 30.

A third, generally similar set of tapered stem centering comb members 288 is mounted on posts 289 secured to a plate 290 which in turn is secured by screws 291 to the top of a stemming roll gear box 292. A plurality of pins 293 also are mounted on the plate 290 and extend diagonally toward the tapered comb members 288 in the direction of turret rotation to assist still further in bringing the projecting cherry stems into radially centered position prior to their entrance between the stemming rolls.

Stemming rolls

A pair of stemming rolls 294 and 295 is provided for each circularly aligned row of pitting cup cavities 181 around the pitting turret A. The stemming rolls of each pair are adapted to receive between them the properly centered stems of the cherries in the pitting cups, and, by rotation of the rolls in opposite directions, to extract the stems from the cherries. Each stemming roll (Figs. 1, 2, 3 and 17) comprises a shaft portion 297 having a rubber covered stem engaging portion 298 thereon with its entrance end tapered to guide the cherry stems between the rubber covered roll portions. One end of each stemming roll shaft portion 297 is journaled in the gear box 292 (Figs. 1, 2, 3 and 4) mounted on the frame channel bracket 34, while the other end of each stemming roll shaft is journaled in a bearing member 300 mounted on the free end of a bearing support bracket 301 (Figs. 2, 3 and 4) secured to a side of the gear box 292 to extend horizontally therefrom in the direction of pitting turret rotation.

A stemming roll drive shaft 302 (Fig. 2) is mounted with its forward end journaled in the gear box 292 and has conventional geared driving connection (not shown) with the stemming rolls to drive them oppositely in pairs. The stemming roll drive shaft 302 extends rearwardly from the gear box 292 through a hole provided therefor in the upright frame plate 32, and is journaled in a bearing 303 (Fig. 3) secured to the rear side of the upright frame plate 32 concentrically over the shaft hole therein. A collar 304 (Fig. 2) is secured to the stemming roll drive shaft 302 by a set screw 305 to prevent endwise displacement of the shaft.

The rotary screen E (Figs. 1 and 2) for separating the pits from the cherries discharged by the machine, has a spider 307 (Fig. 1) therein, the hub of which is secured to a shaft 308 journaled in a bearing bracket 309 (Fig. 4) similar to the bearing bracket 147 in which is journaled the pitting turret support shaft 143.

Drive mechanism

For driving the various rotating elements of the stemming and pitting machine, a grooved pulley 310 (Fig. 6) is mounted on the power take-off shaft of a conventional speed reducer 311 (Fig. 7) driven by an electric motor 312. A V-belt 313 passes around the grooved pulley 310 and also around one groove of a smaller double grooved pulley 314 secured to a stub shaft 315 journaled in a bearing bracket 317 mounted on the upright frame plate 32. The stub shaft 315 also has a spur pinion 318 (indicated in dotted lines in Fig. 6) keyed thereto, the pinion 318 being in mesh with a driven gear 319 keyed to the feed chute actuating cam shaft 95 upon which the chute actuating cam 109 and the small feed reel drive sprocket 120, mentioned previously herein, also are mounted.

The driven gear 319 on the chute actuating cam shaft 95 is in mesh with a gear 320 keyed to a stub shaft 321 journaled in a conventional bearing bracket, not shown, mounted on the upright frame plate 32. A sprocket 322 also is keyed to the stub shaft 321 to rotate with the gear 320. An endless chain 323 passes around the sprocket 322 and also around the large pitting turret drive sprocket 151 adjustably secured to the pitting turret drive shaft 143. A slack take-up idler sprocket 325 is mounted on a stud 327 adjustably mounted in a slot 328 in a bracket 329 mounted (Figs. 3 and 6) on the transverse frame angle member 38 to bear against the outer side of the pitting turret drive chain 323.

Rotative adjustment of the pitting turret drive sprocket 151 relatively to the turret drive shaft 143 is necessary in order to permit synchronization of the pitting turret A with the rotary feeding device D and the chute actuating cam shaft 95, so as to insure that successive batches of cherries will be fed into the feed chute 76 at proper times to be trapped by the intermediate chute portion 82 and will be released thereby as the lower chute portion 88 is swung to move congruently with successive sets of pitting cup cavities 181 of the pitting turret A.

The sprocket 151 is mounted for rotative adjustment on the shaft 143 by means of a special hub structure comprising a cylindrical hub block 331 secured to the shaft 143 by a key 332 (Fig. 11) and set screws 333. The sprocket 151 has a central hole therein which is fitted into an annular rabbeted groove 334 provided marginally around the rear end of the hub block 331. The annular groove 334 is slightly less in depth axially of the block 331 than the thickness of the sprocket 151, and a clamp ring 335 and cap screws 337 clamp the sprocket in rotatively adjusted position in the groove. The cap screws 337 also pass through holes in a second and smaller sprocket 338, mounted in concentric relation to the turret drive shaft 143, and held in axially spaced relation to the sprocket 151 by the clamp ring 335. For rotatively moving the sprocket 151 on the hub block 331, a stud 339 (Figs. 3 and 11) has a reduced threaded shank portion 340 thereof inserted in a hole in the sprocket 151 and secured therein by a nut 341. The body of the stud 339 projects forwardly from the sprocket 151 and is mounted between a pair of lugs 342 formed integrally with the hub block 331 and spaced apart by a distance substantially greater than the width of the body of the stud 339. A pair of adjusting screws 343 are screwed from opposite directions through threaded holes in the lugs 342 so that upon loosening the cap screws 337 which clamp the sprocket 151 to the hub block 331, the sprocket can be rotatively adjusted by means of the screws 343.

The driving ratio between the chute actuating cam shaft 95 and the pitting turret drive shaft 143 as determined by the gears 319 and 320 and the chain 323 is such as to move the pitting units C on the pitting turret A in synchronism with the pocketed feed members 45 on the feed reel disc 47. Since, in the illustrated embodiment of the invention, there are six of each, the pitting turret A is driven to rotate at the same speed as the feed reel.

For rotatively driving the rotary screen E, a chain 347 (Fig. 6) passes around the smaller sprocket 338 on the rear end of the pitting turret support shaft 143 and also around a sprocket 348 secured to the rear end of the rotary screen support shaft 308. The speed of rotation of the rotary screen E is not critical, nor is that of the stemming roll drive shaft 302 which is driven by a V-belt 349 passing around a grooved pulley 350 on the stemming roll drive shaft 302 and also around the second portion of the double-grooved pulley 314 on stub shaft 315. The V-belt 349 also passes over a tension adjusting idler pulley 351 mounted on a bracket 352 (Figs. 3 and 6) adjustably secured to the transverse frame bracing angle member 38.

Operation

In the operation of the embodiment of the invention illustrated in Figs. 1 to 18, inclusive, assuming that the motors 27 and 312 are running and that the speed reducers 28 and 311 have been adjusted to desired speeds, a supply of cherries 114 is dumped into the receiving hopper G (Fig. 7). While the present invention is capable of handling and pitting de-stemmed cherries it will not align such de-stemmed cherries, so for the purpose of the present description, it will be assumed that the cherries fed into the elevator have their stems 115 attached, but have been de-clustered. The cherries are carried up the elevator F on the flight strips 23 on the elevator belt 22 and are dumped into the feed hopper H. The rate of feed by the elevator should be such as not to overfill the feed hopper.

The rotating feed reel disc 47 (Fig. 5) carries the pocketed feed members 45 beneath the box shield 53 and thence upwardly through the mass of cherries in the feed hopper H where a cherry is picked up by each of the pocket recesses 59 as the feed members 45 emerge from the mass of cherries in the feed hopper H. Each cam follower roller 64 (Fig. 4) on the weighted arm 63 of a feed member 45, in passing over the series of bumps 70 on the feed cam track 67, rocks its associated feed member 45 to shake off any extra or unseated cherries which may have been carried up by the feed members. As each feed member 45 arrives over the feed chute 76, the rollers 64 and 65 ride over the cam projections 71 and 72, inverting the feed member 45 and dumping each of the cherries carried thereby into one of the passages formed by the partition 79a in the fixed upper chute portion 79, of the feed chute 76, after which the inturned end portion 73 of the strap cam member 74 swings the feed member 45 in the opposite direction to clear the upper end of the feed chute 76.

As the cherries of each batch thereof are thus dumped into individual passages in the feed chute 76, the intermediate gate portion 82 of the feed chute will have been swung by the roller 107 riding onto the high portion of the cam track 108 (Fig. 1) to its closed position to trap the cherries 114. Cherries which enter the passages of the upper chute portion 79 in stem-end-down position will have their stems projecting through the gap (Fig. 5) between the side portion 84 of the intermediate chute member 82 and the lower end of the feed hopper side plate 80 in a position to strike the upper edge of the lower chute member 88 when released and be swung to stem-end-up position thereby.

Rotation of the chute actuating cam 109 at six times feed reel speed as described previously herein then moves the intermediate chute actuating roller 107 onto the low portion on the cam track 108 to free the lever arm 90 for pivotal movement by the coil spring 93. This swings the intermediate chute portion 82 to its open or discharging position (Figs. 1 and 4) at the same time that the lower chute portion 88 is being swung congruently with the feed cups of a pitting unit C by the action of the grooved cam track 142 on the cam follower roller 141. The cherries released by the swinging of the intermediate chute portion 82 to its open position gravitate in stem-end-up position downwardly through their respective passages 87 in the lower chute portion 88 and land stem-end-up in the pitting cup cavities 181. The rubber strip 189 around each pitting cup block 180 restrains the cherries from bouncing off the pitting cup block when dropped thereon.

The various operations performed in connection with a pitting unit C during rotation of the turret are shown diagrammatically in Fig. 17. As each pitting unit C is carried past beneath the congruently moving discharge end of the lowermost chute portion 88, the cherries 114 drop through the passages 87 therein. At this stage of the rotative cycle of the pitting unit, the rubber faced jaws 170 and 171 are retained in open condition by the jaw actuating cam follower roller 262 riding on the high portion 389 (Fig. 12) of the grooved cam track 268 in the rear cam ring 161. The cherries drop into the cup cavities 181 on opposite sides of the stem separating wires 281 (Figs. 1, 2, 3 and 17) which extend beyond the feeding zone from the narrow ends of the first set of tapered comb members 278. Therefore, in the event that the stems of any two cherries in laterally adjacent cup cavities should become entangled with each other, the curved wires 281 will guide such entangled stems onto the tapered comb members 278 for separation thereby as the cherries are carried around their circular paths by the rotation of the pitting turret A.

As each pitting unit C with its batch of cherries deposited therein is carried beyond the discharge end of the lower chute portion 88 the jaw closing cam follower roller 262 rides into the low portion 272 (Fig. 12) of the cam track 268, and, by means of the slide bar 257, links 253, and bell crank levers 249 (Fig. 15) swings the jaws 170 and 171 to almost closed condition. In this condition the rubber jaw facing blocks 224 are separated by a distance somewhat greater than the maximum thickness of a cherry stem, and in moving to this almost closed condition the jaws engage the portion of the stem between the jaw facing blocks and swing it toward a radial plane of the turret. During this initial partial closing of the jaws the sheet rubber retaining strips 189 are folded inwardly slightly by the jaws 170 and 171 as shown in Figs. 14 and 17 to overlie the pitting blocks 180. The quarter-spherical recesses 229 in the rubber facing blocks 224 fit together over the pitting cup cavities 181 loosely to enclose the individual cherries in the compartments thus formed.

The stems 115 of the cherries 114 thus enclosed and loosely held, extending outwardly between the slightly separated jaws 170 and 171 are engaged successively by the rubber fingered brush 273, the three sets of comb members 278, 282 and 288, and the pins 293 to separate any stems which may be entangled with each other, and to center the stems, thereby to swing the loosely enclosed cherries to desired positions with their stem-blossom axes disposed radially of the pitting turret.

As each pitting unit C passes the last set of comb members 288, the centered stems of the cherries in the pitting cups are carried between the tapered entrance ends of the oppositely rotating stemming rolls 294 and 295 which almost instantly extract the stems. At this stage of their cycle the jaws 170 and 171 are freed for further closing movement by a further drop 388 (Fig. 12) in the grooved cam track 268 in the rear cam ring 161, and the pitting prong assembly 169 is moved outwardly by the action on the pitting cam follower roller 209 (Fig. 11) of the rise 218 (Fig. 13) in the grooved cam track 210 in the front pitting cam ring 160, thereby causing the pitting prongs 197 to penetrate the fruit in the pitting cups. This outward movement of the pitting prong assembly 169 also causes the cam shoulders 195 of the cam block 193 of the pitting assembly to enter between the rollers 232 on the lower ends of the jaw mounted lever arms 231, thereby swinging the lower ends of these lever arms apart. Through their adjustable connection with the bifurcated arms 230 of the jaw body portion 220 this squeezes the rubber facing blocks 224 on the jaws tightly together during the portion of the pitting operation wherein the pit is ejected from between the jaws.

The amount of final closing or squeezing movement of the jaws 170 and 171 by the cam shoulders 195 can be regulated by loosening the cap screws 235, turning the eccentric adjusting members 233 to a desired position by means of a wrench applied to their nut portions 234, and again tightening the cap screws 235. Sufficient pressure should be applied to the jaws by this final squeezing action to strip the flesh from the pit as it is ejected.

The location of the rise 218 in the pitting prong cam track 210 can be adjusted by means of the cap screws 164 (Fig. 2) in the arcuate slots 163 so as to cause ejection of the pits from between the resilient facing blocks 224 shortly after the cherry clears the stemming rolls. Upon completion of the pitting stroke, the pitting prongs are again withdrawn to their normal, retracted position as the pitting prong actuating roller 209 passes beyond the high point of the rise 218 (Fig. 13) in the pitting cam track 210.

Approximately at the same time the pitting prongs are retracted to their normal position the associated jaws 170 and 171 are opened by the passing of the jaw actuating roller 262 onto the higher portion 389 (Fig. 12) of its cam track 268. As the jaws are opened the pitted, de-stemmed cherries, by a combination of gravity and centrifugal force, are thrown out of the pitting cup cavities 181 into a chute 390 (Figs. 1 and 2) which conveys them, together with the removed pits, into the rotary screen E, where the pits pass out between the wires of the screen while the pitted and de-stemmed cherries gradually roll along the screen and out of its open discharge end. Since the pits are ejected ahead of the cherries a plurality of chutes can be provided if desired one at each discharge zone to catch and convey the stems, pits and cherries respectively to separate disposal areas. However, since such arrangements are well known in the art of fruit processing they will not be illustrated and described herein.

*Modified belt feed*

The basic frame structure and pitting turret of the modification shown in Figs. 19 and 20 are the same as those illustrated in Figs. 1 to 18, inclusive, and described previously herein. Therefore, such previously described parts are referred to herein by the same reference numerals as are applied thereto in the foregoing description thereof and in Figs. 1 to 18 of the drawings. An important advantage of the feed belt I over the rotary feeding device D resides in the fact that the feed belt is not limited by centrifugal force as to maximum speed as is the rotary feeder D. Therefore, the pitting rotor A can be operated at a much higher speed when using the belt feed than when using the rotary feeder D or similarly limited feeding device.

In the modified feed mechanism shown in Figs. 19 and 20, an endless feed belt I, having a plurality of cherry receiving feed holes 360 therein, is trained around idler rolls 361, 362, 363 and 364 and also around a power driven belt driving roll 365. The roll 365 has a plurality of driving studs 367 mounted to project radially from its

17 periphery, and these studs are so disposed as to enter predetermined feed holes 360 in the belt I for positive driving engagement therewith.

The upper run 368 of the feed belt I passes substantially tangentially across the top of the pitting turret A, which is the same as that shown in Figs. 1 to 18, inclusive. The idler rolls 362, 363 and 364 are journaled on shaft brackets, not shown, generally similar to the feed reel support bracket 52 (Figs. 3 and 11) mounted on the upright plate 32, while the belt driving roll 365 is mounted and driven similarly to the pitting turret A (Fig. 3).

The lowermost belt idler roll 361 is journaled on a shaft 369 (Fig. 19) mounted in bearings 370 supported on angle frame members 371, and the upwardly sloping run of the belt I between the idler rolls 361 and 362, rides along the bottom of a correspondingly sloping trough member 372 the lower end of which is mounted on supports 373 secured to the angle frame members 371, while its upper end is secured to an angle frame bracket 356 (Fig. 19) secured to the basic frame structure described previously herein.

A hopper wall 375 is provided along the lower portions of the side walls of the sloping trough 372 and transversely of the belt I to form a hopper K for receiving a mass of cherries dumped promiscuously therein. The cherries gravitate into the holes 360 in the belt I as it is driven by the drive roll 365 in a counter-clockwise direction as viewed in Fig. 19, and are carried up the sloping run 377 of the feed belt, being supported in the belt holes 360 by the underlying bottom of the trough 372.

The belt holes are disposed in sets spaced apart transversely of the belt I to conform to the spacing of the cup cavities 181 in each pitting unit C of the pitting turret A. However, successive sets of these holes are spaced apart longitudinally of the belt by a distance greater than twice the length of an average cherry stem, so that in the event the stems of any two cherries should remain unseparated during the de-clustering operation, they would be prevented by their attached stems from seating in two longitudinally adjacent holes, they would be prevented by their interconnected stems from dropping through the belt into the pitting cups. A rotary brush 378, mounted on adjustable brackets 376 adjacent the upper end of the upwardly sloping run 377 of the feed belt I brushes back toward the hopper K any cherries not properly seated in the belt holes 360 including any which may have stem attachment with a cherry seated in one of the belt holes 360.

Since the longitudinal separation between adjacent sets of belt holes 360 is greater than the circumferential separation between the pitting cavities 181 of adjacent pitting units C of the pitting turret A the belt I is driven at a sufficiently greater speed than the pitting turret A to bring successive sets of belt holes 360 into register with successive sets of pitting cavities 181 at the predetermined desired zone of transfer of the cherries from the belt holes 360 to the pitting cup cavities 181.

The cherries are supported in the holes 360 by the bottom of the sloping trough 372 up to a point closely adjacent the upper idler roll 362, then by the idler roll 362 as the cherries pass over it, and then by the bottom plate 379 (Fig. 20) of a short trough 380, which is mounted on the angularly disposed frame member 100. The bottom plate 379 of the short trough 380 is provided with a plurality of elongated transfer gaps 381 in its terminal or left hand end portion as viewed in Fig. 20, each of the gaps being in alignment with a row of holes 360 longitudinally of the belt I and also with a circular row of pitting cup cavities 181 in the pitting turret A.

Each of the gaps 381 is sufficiently wide at its inner or right hand end to allow a cherry 270 in a hole 360 in the feed belt I to drop downwardly therethrough into a pitting cup cavity 181 in register therewith, and is narrowed toward its left hand or terminal end. The terminal or left hand end portion of the bottom plate 379 of the short trough 380 extends beyond the terminal ends of the side walls 382 thereof and is curved downwardly to be disposed closely adjacent the circular path of the pitting jaws 170 and 171 as they are carried around by the rotation of the pitting turret A. The converging edges of the gradually narrowing gaps 381 guide the outwardly projecting stems 271 of the cherries 270 in the pitting cup cavities 181 toward a radially centered position in the same manner as was explained previously herein for the stem centering combs 278, 282 and 288.

A modified stem pulling mechanism is incorporated in the modified form of the invention, shown in Fig. 19, and comprises a plurality of pairs of stemming discs 383 disposed at slight acute angles to each other and contacting marginally in pairs throughout a small segmental portion thereof as disclosed in the patent application of Walter W. Kelly, Serial No. 708,000, filed Nov. 6, 1946, now Patent No. 2,540,740, issued Feb. 6, 1951. Since the mounting of the Kelly disc stemmer on a mechanism embodying the present invention would be within the capability of one ordinarily skilled in the art it will not be explained in detail herein. A stemming disc drive chain 384 (Fig. 19) passes around a sprocket 385 on a drive shaft 302a corresponding to the stemming roll drive shaft 302 of Figs. 2 and 4 and which was described previously herein. The chain 384 also passes around a sprocket 386 secured to shaft 387, upon which the stemming discs 383 are mounted.

Since the operation of the feed belt arrangement shown in Figs. 19 and 20 is fully set forth in the foregoing brief description thereof it will not be necessary further to describe it herein.

While I have fully disclosed a preferred embodiment of the present invention it will be understood however that various changes and modifications may be made in the details thereof without departing from the spirit and scope of the invention as set forth in the appended claims. What I claim as new and desire to protect by Letters Patent is as follows:

1. A cherry pitting machine comprising a frame, a rotary pitting turret mounted on said frame, means for continuously rotating said turret, a pitting cup on said turret, feed means having a discharge portion thereof adapted to move congruently with said pitting cup for a predetermined distance to deposit a cherry stem-end-out therein, a pitting prong movable within said pitting cup, cooperating closure members disposed adjacent said pitting cup and movable from an open condition exposing said pitting cup for the feeding of a cherry therein, to a closed condition overlying said cup to loosely retain a cherry therein with the stem extending outwardly between said members, means responsive to the rotation of the turret and engageable with the stem of the cherry exteriorly of said cup for bringing the cherry enclosed in said pitting cup to a predetermined condition of alignment relative to said prong, and actuating means connected in timed relation to said turret rotating means to actuate said feed means, said closure members and said pitting prong.

2. A machine for pitting stem-bearing fruit comprising a pitting cup mounted to move along a predetermined path, means for depositing a cherry stem-end-out in said cup at a predetermined zone of said path, a pair of jaw members mounted on opposite sides of said cup and adapted to close over said cup, adjacent sides of said jaws over said cup being faced with resiliently deformable material, means for partially closing said jaws at a zone of said path beyond the point of cherry deposit to swing the stem toward a mid-plane between said jaw facings, stem guide means mounted to converge from opposite directions along said mid-plane to move the stem toward a centered position, and pitting means mounted to move into said cup to engage the pit of a cherry in said cup and eject the pit outwardly between the deformable jaw facings.

3. A machine for pitting stem-bearing fruit comprising a pitting cup mounted to move along a predetermined path, means for depositing a cherry stem-end-out in said cup at a predetermined zone of said path, a pair of jaw members mounted on opposite sides of said cup and adapted to close over said cup loosely to enclose a cherry therein, adjacent sides of said jaws over said cup being faced with resiliently deformable material, means for partially closing said jaws at a zone of said path beyond the zone of cherry deposit to engage the stem and swing it toward a mid-plane between said jaw facings, stem centering means mounted to converge from opposite directions along said midplane to engage the stem and swing it toward a centered position, pitting means mounted to move into said cup to penetrate a cherry in said cup and eject the pit of said cherry outwardly between the deformable jaw facings, and means acting between the pitting means and the jaws to squeeze the resilient jaw facings into contact with each other during the pitting stroke.

4. A cherry pitting machine comprising a frame, a feed chute mounted on said frame and adapted to receive and conduct therethrough a cherry fed into said chute, means mounted to control the movement of a cherry through said chute, a rotary pitting turret mounted beneath the lower end of said chute, a pitting cup on said turret adapted to receive therein a cherry discharged through said feed chute, a pitting prong adapted to be advanced centrally through said pitting cup, cooperating resiliently faced closure members disposed adjacent said pitting cup and movable from an open condition exposing said pitting cup for the feeding of a cherry therein, to a partially closed condition overlying said cup to loosely retain a cherry therein, guide means engageable with the stem of the cherry for bringing the cherry in said pitting cup to a predetermined condition of alignment, means for moving said resiliently faced closing members into close abutting contact after said cherry is in said aligned condition, and timed actuating means mounted sequentially to actuate said feed control means, said closure members and said pitting prong.

5. A mechanism for pitting and stemming fruit with stems attached comprising a frame, a pitting turret mounted for rotation on said frame, a pitting cup mounted on said turret to move in a predetermined cycle upon rotation of said turret, said pitting cup having an opening therein, a normally retracted pitting prong mounted to reciprocate through said cup opening, means for depositing an individual fruit stem-end-out in said pitting cup at a predetermined stage of its cycle, a pair of jaws mounted on opposite sides of said pitting cup, resilient facing portions carried by said jaws and adapted to close over the cup, said jaws having complementary recesses therein adapted to form, with said pitting cup, an enclosure for a cherry deposited stem-end-out in said pitting cup, means for partially closing the jaws to swing the stem of the enclosed cherry toward a radially outwardly projecting position, thereby initially to align the cherry in its enclosure, stem centering means mounted to engage the initially aligned projecting stem and move it toward radially centered position, thereby finally to align the cherry in its enclosure, means for gripping and extracting the stem, means for finally closing said jaws, and means for actuating said pitting prong to move it outwardly to penetrate the cherry, and to eject the pit thereof between the resilient facing portions of the closed jaws.

6. In a machine for pitting fruit with stems attached, a rotary pitting turret, a plurality of pitting units disposed about said turret, each pitting unit comprising a plurality of pitting cups aligned parallel to the axis of turret rotation, means for introducing a stem-bearing fruit in stem-end-out position in each pitting cup, a plurality of pitting members mounted on the turret and adapted to be moved into the pitting cups, a pair of resiliently faced jaw members adapted to close over the pitting cups of each unit to overlie the fruit in the pitting cups thereof, means for moving the jaw members toward closed condition to engage and swing toward a predetermined position the outwardly directed stems of fruit in said pitting cups, means for advancing the pitting members into the pitting cups toward the closed jaw members, thereby to engage the pit in each enclosed fruit to eject the pit from between the closed resiliently faced jaw members, and cam means acting between the jaw members and the pitting members to exert a final closing force on the jaw members during a pit ejecting movement of the pitting members.

7. In a mechanism for pitting stem-bearing fruit, a pitting unit comprising a pitting cup, pitting means movable transversely of the pitting cup, a pair of jaws mounted to close from opposite sides over said pitting cup, said jaws having recesses therein complementary to each other and to said pitting cup in the closed position of the jaws to form a chamber adapted loosely to enclose a cherry therein, means for separating said jaws to expose the pitting cup to receive a cherry therein, means for depositing a cherry stem-end-out in said pitting cup, means for partially closing said jaws to engage the stem of a cherry deposited in the pitting cup, thereby to swing the stem and the cherry, toward a predetermined condition of alignment, means for fully closing the jaws into contact with each other to grip the stem, and timed means mounted to move the pitting means to engage the pit of a cherry in said pitting cup and to force the pit outwardly from between the jaws.

8. A machine for pitting stem-bearing fruit comprising a stationary frame, a pitting cup mounted to move along a predetermined path relative to said frame, means for depositing an individual fruit stem-end-out in said cup at a predetermined zone of said path, a pair of pivotal jaw members mounted on opposite sides of said cup and arranged to be moved to closing position over said cup, adjacent sides of said jaws over said cup being faced with deflectable material, an actuating mechanism connected to said jaws, means operatively connected between said frame and said actuating mechanism for partially closing said jaws at a zone of said path beyond the point of fruit deposit to swing the stem toward a mid-plane between said jaw facings, stationary guide means having guide surfaces arranged to converge from opposite sides along said mid-plane to move the stem toward a centered position, and pitting means mounted to move into said cup to engage the pit of the fruit therein and eject the pit outwardly between said deflectable jaw facings.

9. A machine for pitting stem-bearing fruit comprising a stationary frame, a pitting cup mounted to move along a predetermined path relative to said frame, means for depositing an individual fruit stem-end-out in said cup at a predetermined zone of said path, a pair of pivotal jaw members mounted on opposite sides of said cup and arranged to be moved to closing position over said cup, adjacent sides of said jaws over said cup being faced with deflectable material, an actuating mechanism connected to said jaws, means operatively connected between said frame and said actuating mechanism for partially closing said jaws at a zone of said path beyond the point of fruit deposit to swing the stem toward a mid-plane between said jaw facings, stationary stem guide means having guide surfaces arranged to converge from opposite sides along said mid-plane to move the stem toward a centered position, and pitting means mounted to move into said cup to engage the pit of the fruit therein and eject the pit outwardly between said deflectable jaw facings, and an actuating arm carried by said pitting means and movable into engagement with said jaw actuating mechanism to move the deflectable jaw facings into contact with each other during the pitting stroke.

10. In a machine for pitting fruit, a stationary frame, a power driven shaft rotatably journaled in said frame, a cam ring secured to said stationary frame concentric with said shaft and having a camming groove, a turret keyed to said shaft for rotation therewith, a cup support member carried by said turret and extending outwardly from one face of the turret longitudinally of said shaft, a cup mounted on said support member having an open top and a passage in the bottom wall and being disposed radially of said shaft with the open top in a radially outward position, means defining a radial guide passage in said turret, a block slidable in said passage, a prong support member carried by said block and extending longitudinally of said shaft in alignment with said cup support member, a prong carried by said prong support member in radial alignment with the opening in the bottom wall of said cup, a cam follower engaged in the camming groove of said cam ring, and an actuating linkage connected between said cam follower and said slidable block and arranged to effect radially outward movement of said block and said prong support member as said follower moves along a portion of said stationary cam groove, causing said prong to pass through the opening in said cup.

11. A machine for pitting fruit comprising, a stationary frame, a power driven shaft rotatably journalled in said frame, a cam ring secured to said frame concentric with said shaft and having a cam groove, a turret keyed to said shaft for rotation therewith, a cup support member carried by said turret and extending outwardly therefrom longitudinally of said shaft, a cup mounted on said support member having an open top, a pair of closure members pivotally mounted on said turret for movement toward and away from closed position over said cup, a cam follower engaged in the camming groove of said cam ring, and an actuating linkage connected between said cam follower and said pivotal closure members and arranged to move said closure members toward and away from closed position over said cup as said turret is rotated.

12. In a machine for pitting fruit, a stationary frame, a power driven shaft rotatably journalled in said frame, a pair of cam rings secured to said frame concentric with said shaft, each cam ring having a camming groove, a turret keyed to said shaft for rotation therewith, a cup support member carried by said turret and extending outwardly from one face of said turret longitudinally of said shaft, a cup mounted on said support member having an open top and a reduced passage in the bottom wall, said cup being disposed generally radially of said shaft with the open top in a radially outward position, means defining a radial guide passage in said turret, a block slidable in said passage, a prong support member carried by said block and extending longitudinally of said shaft in alignment with said cup support member, a prong carried by said prong support member in radial alignment with the passage in the bottom wall of said cup, a first cam follower engaged in the camming groove of one of said cam rings, an actuating linkage connected between said first cam follower and said slidable block and arranged to effect radially outward movement of said block and said prong support member as said turret is rotated causing said prong to pass through the passage in said cup, a pair of closure members pivotally mounted on said turret to move toward and away from closing-position over said cup, a second cam follower engaged in the camming groove of the other cam ring, and an actuating linkage connected between said second cam follower and said pivotal closure members and arranged to move said closure members toward and away from closing position over said cup, said camming mechanisms being arranged to move said closure members to closing position prior to movement of said prong toward said cup opening.

13. In a machine for pitting fruit, a stationary frame, a power driven shaft rotatably journalled in said frame, a pair of cam rings secured to said frame concentric with said shaft, each cam ring having a camming groove, a turret keyed to said shaft for rotation therewith, a cup support member carried by said turret and extending outwardly from one face of said turret longitudinally of said shaft, a cup mounted on said support member having an open top and a reduced passage in the bottom wall, said cup being disposed generally radially of said shaft with the open top in a radially outward position, means defining a radial guide passage in said turret, a block slidable in said passage, a prong support member carried by said block and extending longitudinally of said shaft in alignment with said cup support member, a prong carried by said prong support member in radial alignment with the passage in the bottom wall of said sup, a first cam follower engaged in the camming groove of one of said cam rings, an actuating linkage connected between said first cam follower and said slidable block and arranged to effect radially outward movement of said block and said prong support member as said turret is rotated causing said prong to pass through the passage in said cup, a pair of closure members pivotally mounted on said turret to move toward and away from closing position over said cup, a second cam follower engaged in the camming groove of the other cam ring, and an actuating linkage connected between said second cam follower and said pivotal closure members and arranged to move said closure members toward and away from closed position over said cup, said camming mechanisms being arranged to move said closure members to partially closed position prior to movement of said prong toward said cup passage, and an actuating member carried by said prong support member and arranged to be moved into operative engagement with said closure member actuating linkage upon a predetermined movement of said prong toward said cup to further pivot said closure members to fully closed position over said cup as said prong moves through the passage in said cup.

14. A fruit pitting machine of the type having a movable fruit support member having an opening therethrough and a pitting prong movable in said opening, fruit centering means operably associated with said support member and extending about said opening during movement of said support member, a pair of fruit engaging jaws, one on each side of said support member and movable laterally with respect thereto, said jaws having rubber-like opposed portions for embracing and retaining the fruit on said support member and having outer edge portions in closely spaced relationship to each other over the fruit when said jaws are in closed position, whereby when the pitting prong ejects the fruit pit the said jaw edge portions will yield to permit the pit to pass therebetween.

15. A fruit pitting machine as defined in claim 14 having means for moving said jaws towards one another to center the fruit in the plane of movement of said support, and said centering means centers the fruit in a direction normal to said plane of movement.

16. A fruit pitting machine as defined in claim 14 having means actuated by movement of the pitting prong through the support opening for moving the substantially closed jaws closer together to yieldably grip the centered fruit during the pitting operation.

17. A fruit pitting machine as defined in claim 16 having a movable connection on said jaw closing means, and means for adjusting said connection to vary the extent of closing movement of said jaws over the centered fruit by movement of said pitting prong through said opening.

18. A fruit pitting machine as defined in claim 14 wherein said fruit support member comprises a rotatable turret having a plurality of centrally apertured fruit receiving cups mounted in circumferentially spaced relation thereon, each of said cups having a pair of complementary pivotally mounted jaw members, and means for pivotally moving the jaw members towards one another over the cup to initial partially closed position to movably retain a fruit in the cup during centering of the fruit stems, and a pitting prong for each cup having means carried by the turret for moving the prong radially of the turret axis through the cup aperture and through the fruit along the stem blossom axis thereof, said prong moving means engaging and further closing said jaws on their pivotal axes to grip the centered fruit therebetween during the pitting operation to eject the pit and centered fruit stem between the resilient faces of said closed jaws.

References Cited in the file of this patent

UNITED STATES PATENTS

| | | |
|---|---|---|
| 330,839 | Knapp | Nov. 17, 1885 |
| 1,010,848 | Bodman et al. | Dec. 5, 1911 |
| 1,409,804 | Urschel | Mar. 14, 1922 |
| 1,698,477 | Frova | Jan. 8, 1929 |
| 1,876,051 | Gardner | Sept. 6, 1932 |
| 1,924,678 | Curtiss | Aug. 29, 1933 |
| 2,308,039 | Ashlock, Jr. | Jan. 12, 1943 |
| 2,415,418 | Coons | Feb. 11, 1947 |
| 2,428,370 | Kelly | Oct. 7, 1947 |
| 2,429,991 | Coons | Nov. 4, 1947 |
| 2,528,293 | Ashlock, Jr. | Oct. 31, 1950 |
| 2,540,740 | Kelly | Feb. 6, 1951 |

FOREIGN PATENTS

| | | |
|---|---|---|
| 624,961 | France | Apr. 16, 1927 |
| 625,009 | France | Apr. 16, 1927 |
| 637,661 | France | Feb. 6, 1928 |
| 400,542 | Great Britain | Oct. 26, 1933 |